United States Patent
Arai

(10) Patent No.: US 7,177,098 B2
(45) Date of Patent: Feb. 13, 2007

(54) IMAGE PICKUP LENS

(75) Inventor: Takeo Arai, Saitama (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 11/256,877

(22) Filed: Oct. 24, 2005

(65) Prior Publication Data

US 2006/0092528 A1 May 4, 2006

(30) Foreign Application Priority Data

Oct. 28, 2004 (JP) .......................... P2004-314495

(51) Int. Cl.
*G02B 3/02* (2006.01)
*G02B 13/18* (2006.01)

(52) U.S. Cl. .................. 359/715; 359/708; 359/773

(58) Field of Classification Search ............ 359/708, 359/713–715, 755–757, 763, 766, 771–773
See application file for complete search history.

(56) References Cited

U.S. PATENT DOCUMENTS

| 4,758,074 A | * | 7/1988 | Yamakawa | 359/650 |
| 6,747,810 B2 | * | 6/2004 | Sato | 359/715 |
| 7,012,765 B2 | * | 3/2006 | Matsui et al. | 359/771 |
| 7,035,023 B2 | * | 4/2006 | Nanba et al. | 359/785 |
| 7,079,330 B2 | * | 7/2006 | Lee et al. | 359/781 |

* cited by examiner

*Primary Examiner*—Scott J. Sugarman
*Assistant Examiner*—Darryl J. Collins
(74) *Attorney, Agent, or Firm*—Sonnenschein Nath & Rosenthal LLP

(57) ABSTRACT

An image pickup lens can form an excellent optical image on a compact image pickup element having a large number of pixels. The image pickup lens includes, sequentially from the object side, an optical aperture, a first lens made of glass and having at least a spherical surface at the object side and a positive refracting power, a second lens made of resin and having two a spherical surfaces and a negative refracting power, a third lens made of glass and having at least a spherical surface at the object side and a positive refracting power, and a fourth lens made of resin and having two a spherical surfaces and a negative refracting power.

4 Claims, 29 Drawing Sheets

IMAGE PICKUP LENS

CROSS REFERENCES TO RELATED APPLICATIONS

The present invention contains subject matter related to Japanese Patent Application JP 2004-314495 filed in the Japanese Patent Office on Oct. 28, 2004, the entire contents of which being incorporated herein by reference.

BACKGROUND OF THE INVENTION

1. Field of the Invention

The present invention relates to an image pickup lens to be used in an image pickup apparatus such as a digital still camera or a digital video camera. More particularly, it relates to an image pickup lens having four elements in four groups.

2. Description of the Related Art

Image pickup elements such as CCDs (charge coupled devices) and CMOS (complementary metal oxide semiconductors) are being downsized and the number of pixels of such image pickup elements is being increased to improve the image quality due to the recent advancement of the technique of arranging pixels at a micro-pitch.

Then, by turn, the image pickup lens for forming an optical image on a small image pickup element having an increased number of pixels is required to have an enhanced image forming capability and also to be further downsized at reduced cost. However, there arises a problem of tradeoff that it is difficult to enhance the image forming capability of a downsized low cost image pickup lens whereas it is difficult to downsize an image pickup element having a high image forming capability at low cost.

For example, techniques for using a triplet type lens (3 elements in 3 groups) for the image pickup lens and molding at least two of the lenses from synthetic resin have been devised and put to use (see, Patent Document 1: Jpn. Pat. Appln. Laid-Open Publication No. 9-133860).

However, when a triplet type image pickup lens is prepared by using less costly synthetic resin, there arises a problem that it cannot accurately form an image on an image pickup element having a large number of pixels, or more than 3 million pixels to be more specific. When the number of lenses of the image pickup lens is increased simply to improve the image forming capability, the image pickup lens comes to show a large thickness as a whole to make it impossible to meet the request of downsizing.

SUMMARY OF THE INVENTION

In view of the above identified circumstances, it is therefore desirable to provide a high performance image pickup lens having a high image forming capability that matches compact image pickup elements having a large number of pixels at relatively low cost.

According to the present invention, there is provided an image pickup lens including, sequentially from the object side: an optical aperture; a first lens made of glass and having at least a spherical surface at the object side and a positive refracting power; a second lens made of resin and having two a spherical surfaces and a negative refracting power; a third lens made of glass and having at least a spherical surface at the object side and a positive refracting power; and a fourth lens made of resin and having two a spherical surfaces and a negative refracting power.

Thus, an image pickup lens according to the invention has a lens construction of 4 elements in 4 groups and is formed by arranging an optical aperture, a first lens made of glass and having at least a spherical surface at the object side and a positive refracting power, a second lens made of resin and having two a spherical surfaces and a negative refracting power, a third lens made of glass and having at least a spherical surface at the object side and a positive refracting power and a fourth lens made of resin and having two a spherical surfaces and a negative refracting power, the above listed components being arranged in the mentioned order sequentially from the object side.

An image pickup lens according to the invention as described above is advantageous in terms of mass production and manufacturing cost because the second and fourth lenses that are a spherical lenses can be molded and processed by using resin that is a highly moldable and less costly material.

An image pickup lens according to the invention can suppress the chromatic aberration and improve the image forming capability by forming the first and third lenses from glass that is less light dispersing. Additionally, an image pickup lens according to the invention is advantageous in terms of mass production and manufacturing cost because the first and third lenses are spherical lenses.

Thus, in an image pickup lens according to the invention, the first and third lenses are realized as lenses that can suppress the chromatic aberration and show a high image forming capability. Additionally, the second and fourth lenses that are a spherical lenses are provided with an excellent aberration correcting function so that it is possible to provide a high performance lens in terms of image forming capability that matches small image pickup elements having a large number of pixels.

Furthermore, in an image pickup lens according to the invention, the first lens that has an image forming capability can be made thin to show a small volume because an optical aperture is arranged between the object and the first lens. Therefore, if the first lens is made of expensive glass to make it show a high performance, the image pickup lens can be further downsized and prepared at low cost.

DETAILED DESCRIPTION OF THE PREFERRED EMBODIMENTS

Now, the present invention will be described in greater detail by referring to the accompanying drawings that illustrate preferred embodiments of the invention. However, the present invention is by no means limited to the illustrated embodiments and those embodiments can be modified and altered in various different ways without departing from the scope of the present invention.

Firstly, an image pickup lens according to the invention will be described in detail by referring to FIG. 1.

Figure 1:
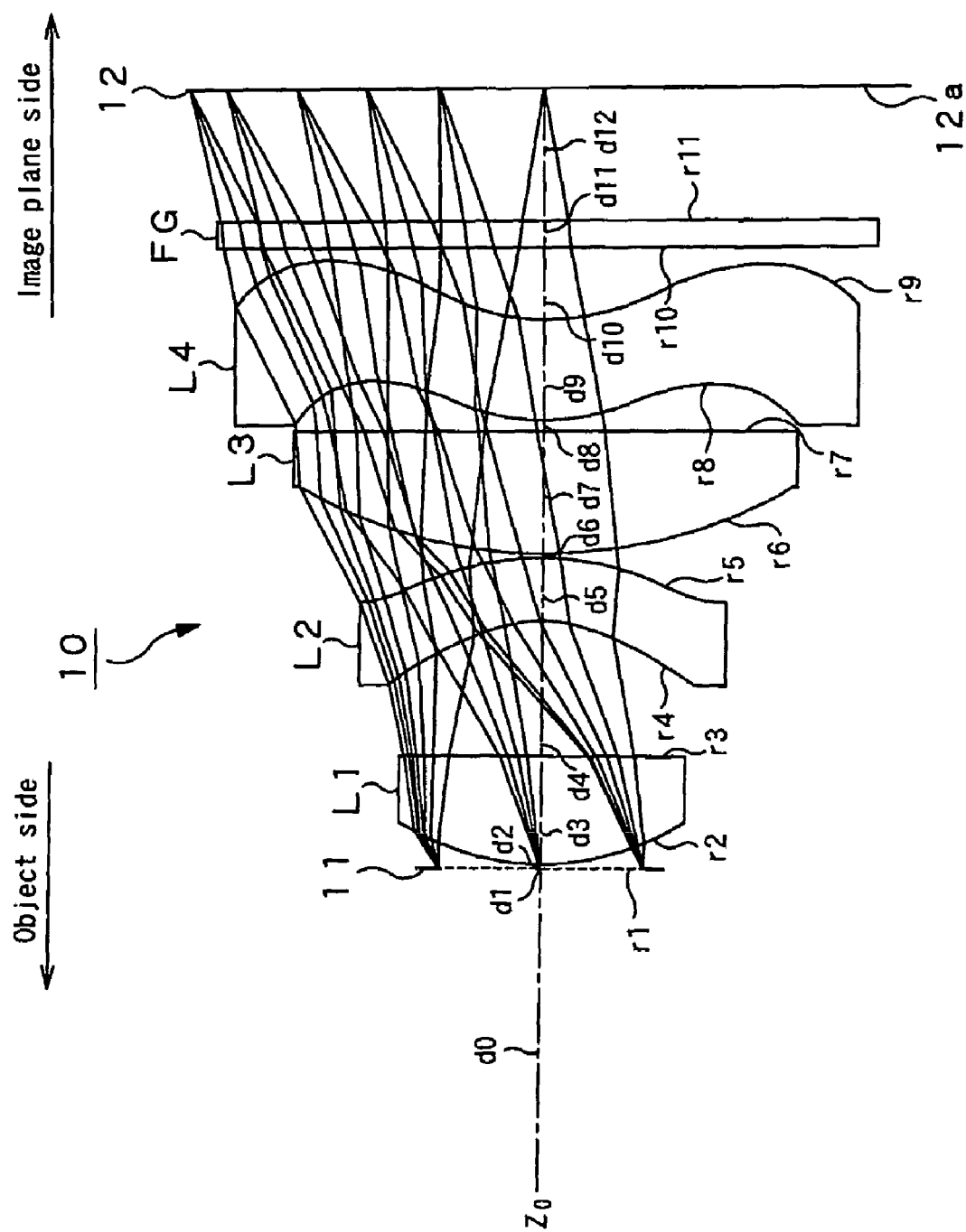
FIG. 1 is a schematic illustration of the configuration of an embodiment of image pickup lens according to the invention.

As shown in FIG. 1, the embodiment of image pickup lens 10 may be so designed as to be used for a digital still camera and includes an aperture 11, a first lens L1, a second lens L2, a third lens L3, a fourth lens L4 and a cover glass FG, which are arranged sequentially in the mentioned order from the object side with their respective optical axes Zo agreeing with each other. Thus, the image pickup lens 10 has a lens construction of 4 elements in 4 groups.

The luminous flux coming from the object side and passing through the image pickup lens 10 eventually forms an image on the image pickup plane 12a of image pickup element 12, which may be a CCD (charge coupled device) or a CMOS (complementary metal oxide semiconductor) arranged at the image forming plane located at the image forming side of the lens 10.

The aperture 11 adjusts the quantity of incident light striking the downstream first lens L1 from the object side. The plane of the aperture 11 is referred to as surface r1.

The first lens L1 is made of optical glass whose optical performance fluctuates little relative to environmental changes in terms of temperature and humidity. The first lens L1 is a glass-made spherical lens having a convex surface located at the object side and showing a positive refracting power so as to make it have an image forming function. More specifically, the first lens L1 is a glass lens having spherical surfaces r2 and r3. However, the first lens L1, or the glass-made spherical lens, may be a plano-convex lens whose surface r3 is a plane as shown in FIG. 1. The first lens L1 is typically made of optical glass such as CAF2 and prepared by machining and polishing.

The second lens L2 is made of resin, which is an easily moldable material. The second lens L2 is a resin-made a spherical lens showing a negative refracting power so as to make it have an aberration correcting function. More specifically, the second lens L2 is a resin a spherical lens having a spherical surfaces r4 and r5. The second lens L2 also has an image correcting function in addition to the above-described aberration correcting function. The second lens L2 is typically made of optical resin such as popular PC (polycarbonate) and prepared by molding.

Like the above-described first lens L1, the third lens L3 is made of optical glass. The third lens L3 has a convex surface located at the object side and shows a positive refracting power so as to make it have an image forming function. More specifically, the third lens L3 is a glass-made spherical lens having spherical surfaces r6 and r7. However, the third lens L3, or the glass-made spherical lens, may be a plano-convex lens whose surface r7 is a plane as shown in FIG. 1. The third lens L3 is typically made of optical glass such as FCD1 (tradename, available from HOYA Corp.) and prepared by machining and polishing.

Like the above-described second lens L2, the fourth lens L4 is made of resin, which is an easily moldable material. The fourth lens L4 is a resin-made a spherical lens showing a negative refracting power so as to make it have an aberration correcting function. More specifically, the fourth lens L4 is a resin a spherical lens having a spherical surfaces Rd. and r9. The fourth lens L4 also has an image correcting function in addition to the above-described aberration correcting function. The fourth lens L4 is typically made of optical resin such as E48R (tradename, available from Zeon Corp.) and prepared by molding.

The cover glass FG is provided to protect the image pickup plane 12a of the above-described image pickup element 12. It is typically a filter cover glass having an IR cutting function. As shown in FIG. 1, the cover glass FG has surfaces r10 and r11.

As pointed out above, the image pickup element 12 is typically a CCD or a CMOS. It is compact and has a large number of pixels, or more than 3 million pixels to be more specific.

Meanwhile, if the Abbe number and the focal length of the first lens L1 of the image pickup lens 10 are $vd_1$ and f1 respectively and the focal length of the image pickup lens 10 as a whole is f, the first lens L1 satisfies $vd_1 \geq 80$ and $0.95f \leq f1 \leq 1.1f$. On the other hand, if the Abbe number and the focal length of the third lens L3 of the image pickup lens 10 are $vd_3$ and f3 respectively and the focal length of the image pickup lens 10 as a whole is f, the third lens L3 satisfies $vd_3 \geq 70$ and $1.5f \leq f3 \leq 2.5f$.

Since the first lens L1 and the third lens L3 of the image pickup lens 10 are spherical lenses made of optical glass as pointed out above, the image pickup lens 10 can be manufactured at low cost on a mass production basis. It is possible to make the first lens L1 and the third lens L3 high performance lenses showing a high image forming capability that can remarkably suppress the chromatic aberration when they are made of low dispersion optical glass.

When at least either the first lens L1 or the third lens L3 is a plano-convex lens, it is possible to reduce the edge thickness of the lens after polishing and centering. Then, while this embodiment of image pickup lens has a lens construction of 4 elements in 4 groups, it is possible to reduce the length of the image pickup lens as a whole so as to achieve lower profile cameras. Additionally, when at least either the first lens L1 or the third lens L3 is a plano-convex lens, it is possible to avoid the problem of eccentricity with ease at the time of assembling the image pickup lens 10. The problem of eccentricity can be avoided more easily when both the first lens L1 and the third lens L3 are plano-convex lenses.

Since the second lens L2 and the fourth lens L4 that are a spherical lenses are made of resin, it is easy to mold them at low cost on a mass production basis. Additionally, it is possible to provide the image pickup lens 10 with an excellent aberration correcting function by means of the second lens L2 and the fourth lens L4 that are a spherical lenses. Thus, this embodiment of image pickup lens 10 is a high performance showing an excellent image forming performance that matches a compact image forming element having a large number of pixels.

Additionally, it is possible to reduce the thickness and hence the volume of the first lens L1 having an image forming function of the image pickup lens 10 when the aperture 11 is arranged between the object and the first lens L1. Therefore, the image pickup lens 10 can be further downsized and prepared at lower cost if the first lens L1 is made of costly optical glass for the purpose of realizing a high performance.

Now, an image pickup lens 10 according to the invention will be described in greater detail by way of examples. While specific materials and numerals are listed in the following description of the first through fourth examples, the present invention is by no means limited by them.

Before describing the examples, Table 1 shows the specified requirements that provide design targets for the image pickup lens 10. It is assumed here that the image pickup element 12 on which the image pickup lens 10 forms an optical image is a CCD having a size of 1/2.7 inches and equipped with 3 million pixels.

TABLE 1

| item | specified requirement |
|---|---|
| image pickup element | 1/2.7 inches (3 million pixels: pixel pitch 2.575 µm) |
| effective circular image diameter | Ø7.0 mm |
| total lens length (lens barrel front end – image pickup plane) | 8.0 mm or more |
| focal length | 5.7 mm |
| horizontal view angle | 50 degrees–53 degrees (including distortion component) |
| F number | F2.8 |
| marginal luminous flux (at 100% image height) | 50% or higher |
| MTF: design value (geometro-optical MTF) | (center) 200/mm: 30% 100/mm: 50% (at 70% image height) 150/mm: 25% 75/mm: 40% |

In each of Examples 1 through 4, which will be described below, an image pickup lens 10 that satisfies the specified requirements as listed in Table 1 is designed and observed for various aberration characteristics and the MTF characteristic.

The parameters that are used in each of the examples will be described below. In each of the examples, the radius of curvature (the paraxial radius of curvature in the case of an a spherical surface) of the i-th surface as counted from the object side (including the surface of the aperture 11, the surfaces of the lenses, the surfaces of the cover glass FG and the image pickup plane 12a of the image pickup element) is expressed by Ri (i=1 through 12). Ri=∞ indicates a plane.

The axial inter-surface distance between the i-th surface and the i+1-th surface along the optical axis Zo is expressed by di (i=1 through 12) and the Abbe number of the material of the j-th lens as counted from the object side is expressed by $vd_j$(j=1, 3).

The axial inter-surface distance d0 is the distance from the object, or the shooting target, to the aperture 11 and IMG represents the image pickup plane 12a of the image pickup element 12, while the axial inter-surface distance d12 is the distance from the surface r11 to the IMF. f represents the focal distance and FNo represents the F number, while ω represents the half view angle.

For an a spherical surface, its profile is expressed by means of well known formula (A) for an a spherical surface as shown below, where X and h are respectively the coordinate in the direction of the optical axis and the coordinate in a direction perpendicular to the optical axis and Ri is the paraxial radius of curvature while K is the conical constant and A, B, C, D, E . . . are higher order a spherical surface coefficients.

$$X = (h^2/Ri)/\left[1 + \sqrt{\{1-(K+1)(h/Ri)^2\}}\right] + \quad (A)$$
$$A \cdot h^4 + B \cdot h^6 + C \cdot h^8 + D \cdot h^{10} + E \cdot h^{12}$$

EXAMPLE 1

Figure 2:
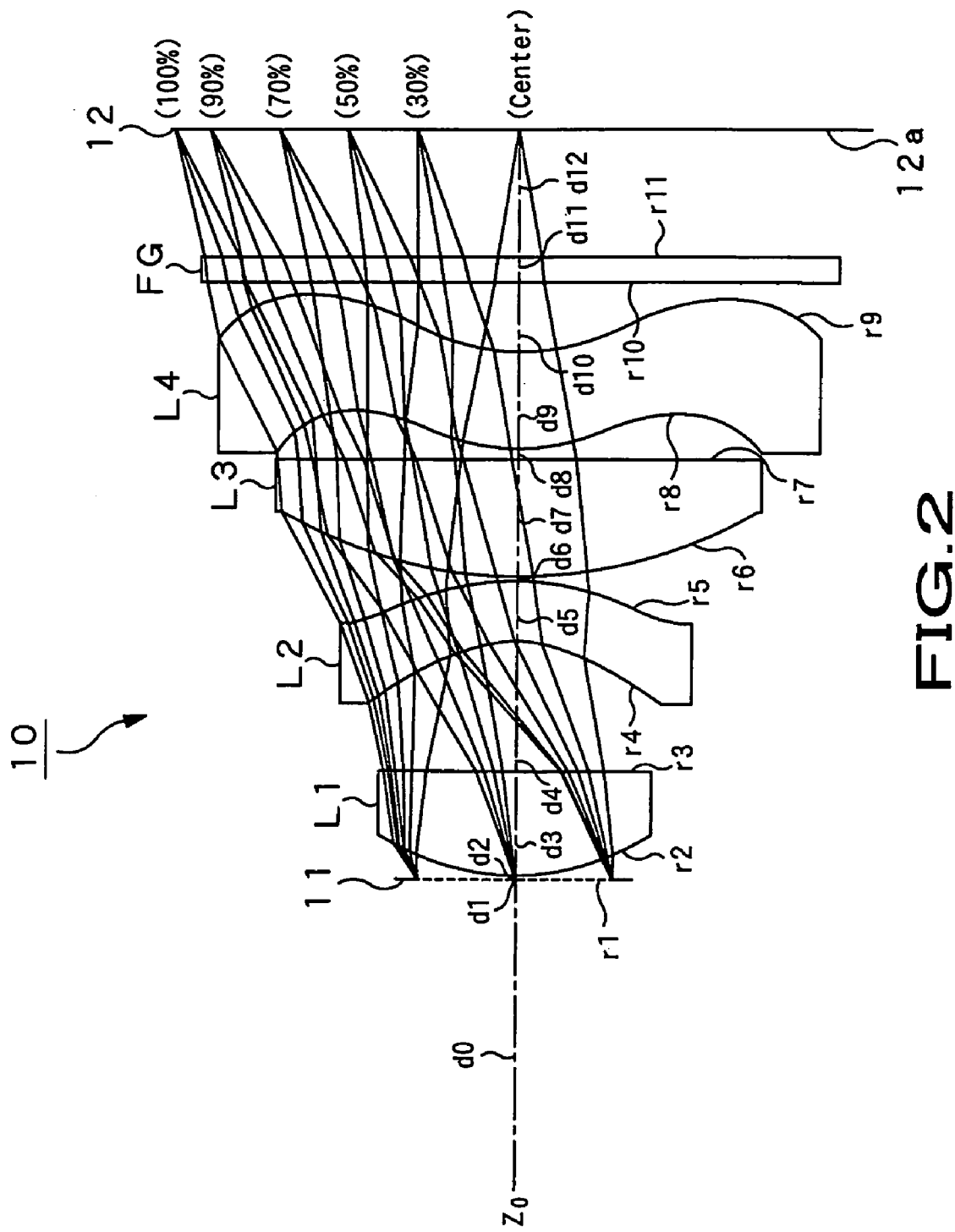
FIG. 2 is a schematic illustration of the configuration of the image pickup lens of Example 1.

FIG. 2 illustrates the image pickup lens 10 of Example 1. In FIG. 2, incident light fluxes that strike the image pickup lens 10 respectively at the center position (0.00 mm), at 30% image height position (1.05 mm), at 50% image height position (1.75 mm), at 70% image height position (2.45 mm), at 90% image height position (3.15 mm) and at 100% image height position (3.50 mm) are shown. Some of the design data of the image pickup lens 10 of Example 1 in FIG. 2 are shown in Table 2 below.

TABLE 2

| f = 5.74 mm FNo = 2.8 ω = 31.3° | | | | |
|---|---|---|---|---|
| surface No. i | radius of curvature R | axial inter-surface distance d | focal distance f | Abbe number vd |
| 0 | ∞ | 2066 | | |
| 1 | ∞ | 2.050 | | |
| 2 | 2.450 | 2.8 | 5.84 | 95.0 |
| 3 | ∞ | 2.8 | | |
| 4 | −1.451 | 3.007 | | |
| 5 | −2.690 | 3.561 | | |
| 6 | 5.094 | 4.871 | 10.22 | 81.6 |
| 7 | ∞ | 5.003 | | |
| 8 | 1.654 | 5.012 | | |
| 9 | 1.466 | 6.135 | | |
| 10 | ∞ | 6.377 | | |

TABLE 2-continued

| | f = 5.74 mm FNo = 2.8 ω = 31.3° | | | |
|---|---|---|---|---|
| surface No. i | radius of curvature R | axial inter-surface distance d | focal distance f | Abbe number vd |
| 11 | ∞ | 6.460 | | |
| 12(IMG) | ∞ | 7.015 | | |

As shown in Table 2, the focal distance f of the entire optical system of the image pickup lens 10 of Example 1 is 5.74 mm and the F number FNo is 2.8, while the half view angle ω is 31.3°. It is also shown in FIG. 2 that the image pickup lens 10 of example 1 is designed to satisfy all the above listed requirements of $vd_1 \geq 80$, $0.95f \leq f1 \leq 1.1f$, $vd_3 \geq 70$ and $1.5f \leq f3 \leq 2.5f$.

Table 3 below shows the conical constant K and the a spherical coefficients A, B, C, D and E of the fourth, sixth, eighth, tenth and twelfth orders that are necessary for computing the a spherical profiles of the surfaces r4 and r5 of the second lens L2 and those of the surfaces Rd. and r9 of the fourth lens L4 by using the above-described on (A), which lenses are glass-made a spherical lenses.

TABLE 3

| surface No. | conical constant | aspherical coefficients | | | | |
|---|---|---|---|---|---|---|
| i | K | A | B | C | D | E |
| 4 | −4.331 | −1.781 × 10⁻¹ | 2.072 × 10⁻¹ | −1.202 × 10⁻¹ | 3.559 × 10⁻² | −4.243 × 10⁻³ |
| 5 | −1.876 | −8.527 × 10⁻² | 8.814 × 10⁻² | −3.363 × 10⁻² | 6.358 × 10⁻³ | −4.585 × 10⁻⁴ |
| 8 | −4.983 | −4.260 × 10⁻² | 9.368 × 10⁻³ | −1.535 × 10⁻³ | 7.852 × 10⁻⁵ | 0 |
| 9 | −4.253 | −2.559 × 10⁻² | 4.632 × 10⁻³ | −6.651 × 10⁻⁴ | 4.308 × 10⁻⁵ | −1.1 × 10⁻⁶ |

Figure 3:
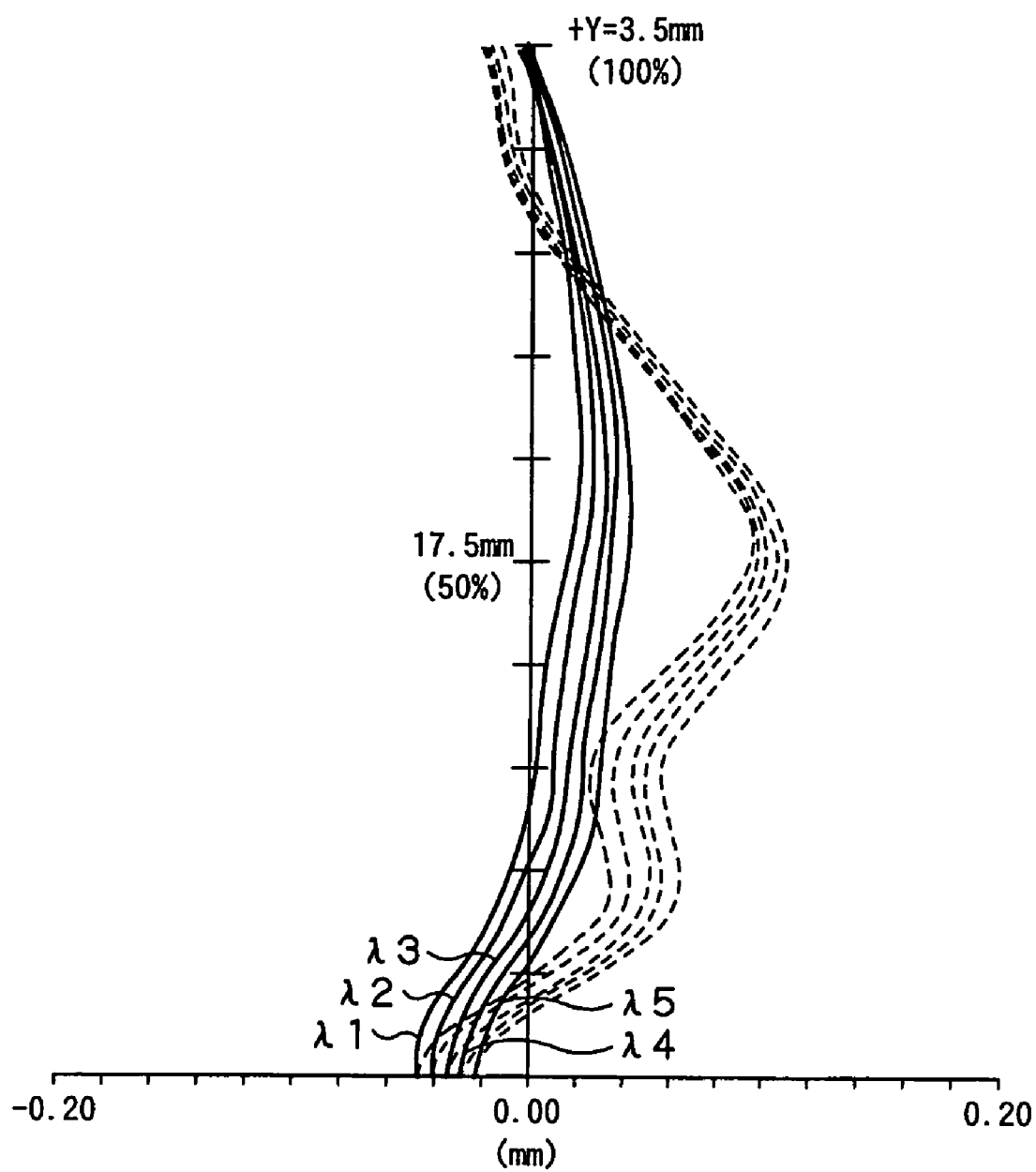
FIG. 3 is a graph of the astigmatism of the image pickup lens of Example 1.
Figure 4:
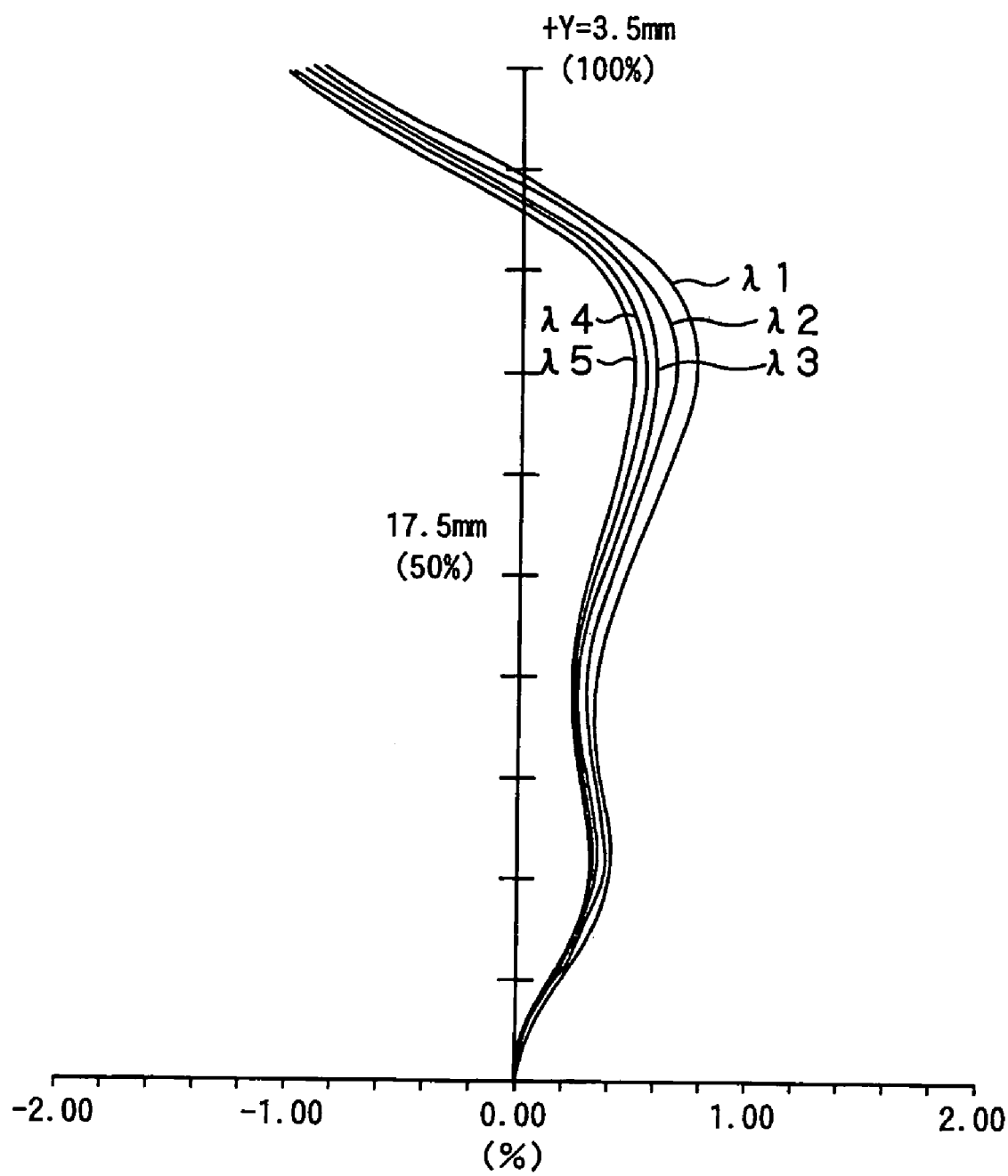
FIG. 4 is a graph of the distortion of the image pickup lens of Example 1.
Figure 5:
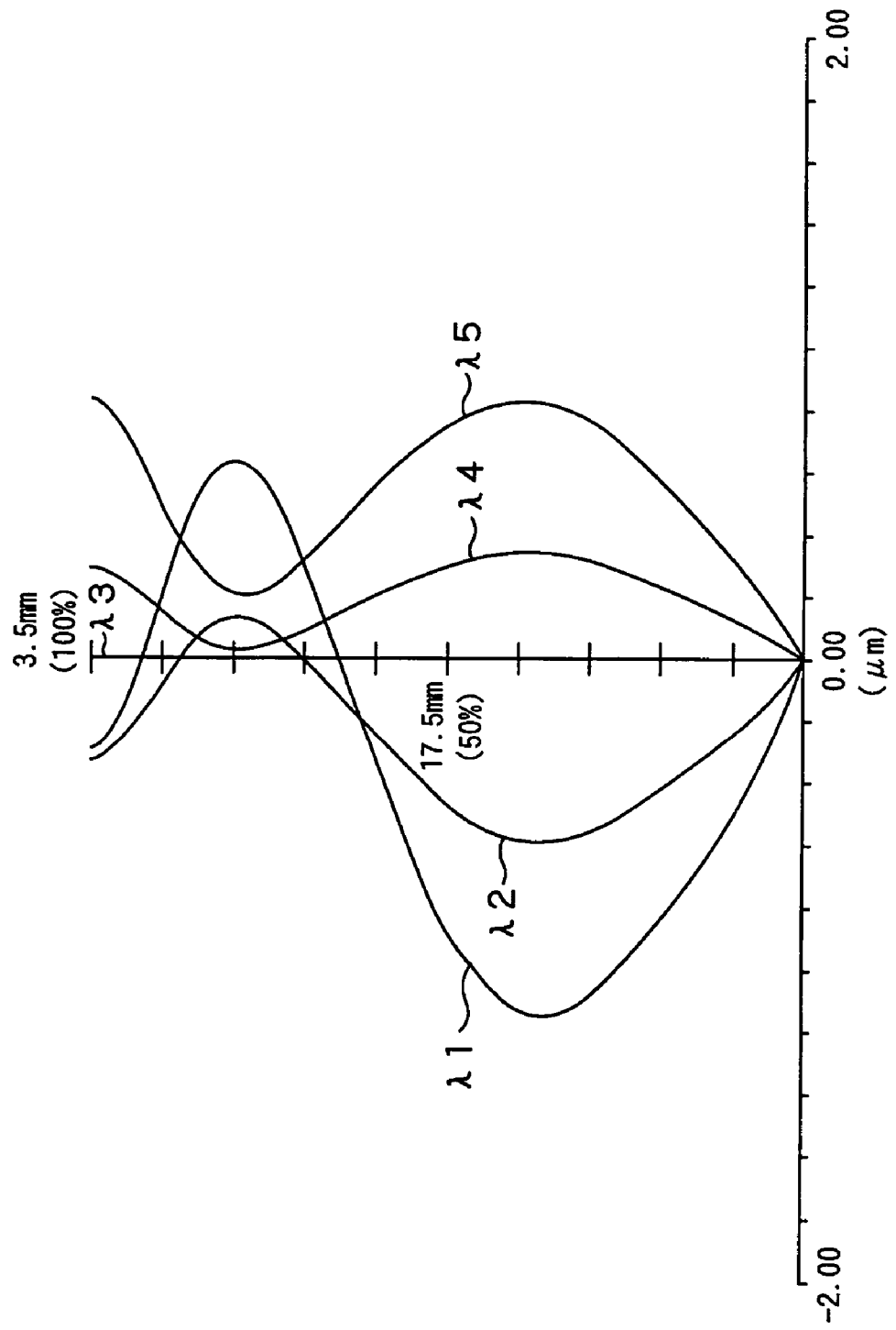
FIG. 5 is a graph of the chromatic difference of magnification of the image pickup lens of Example 1.

FIGS. 3, 4 and 5 show various aberrations of the image pickup lens 10 of Example 1 having the above-described configuration.

FIG. 3 shows the aberrations on the sagittal image plane (indicated by solid lines) and those on the tangential image plane (indicated by broken lines) for respective incident beams of light of wavelengths λ1 (0.436 μm), λ2 (0.486 μm), λ3 (0.546 μm), λ4 (0.588 μm) and λ5 (0.656 μm). As seen from FIG. 3, the image pickup lens 10 shows uniform aberrations and, while the aberrations on the sagittal image plane and those on the tangential image plane show large differences to raise the astigmatism at positions between the 40% image height and the 60% image height, the astigmatism is corrected once again at and near the 80% image height position.

FIG. 4 shows the distortions of the incident beams of light of wavelengths λ1, λ2, λ3, λ4 and λ5 that strike the image pickup lens 10 of Example 1. As seen from FIG. 4, the distortions of the above-cited wavelengths are found within 1%. In other words, they satisfy the requirement of 1 to 2% of the distortion tolerance for ordinary photography lenses so that the image pickup lens 10 of Example 1 can satisfactorily operate as image pickup lens in a digital still camera.

FIG. 5 shows the chromatic differences of magnification of the incident beams of light of wavelengths λ1, λ2, λ4 and λ5 that strike the image pickup lens 10 of Example 1, using the chromatic difference of magnification of the incident beam of wavelength λ3 as reference. As seen from FIG. 5, while the chromatic differences of magnification of the incident beams of light are largest at the 40% image height position, they substantially satisfy the tolerance of ±1 μm so that the image pickup lens 10 of Example 1 can satisfactorily operate as image pickup lens in a digital still camera.

As seen from the graphs of FIGS. 3, 4 and 5, the image pickup lens 10 of Example 1 has an excellent aberration correcting function.

Figure 6:
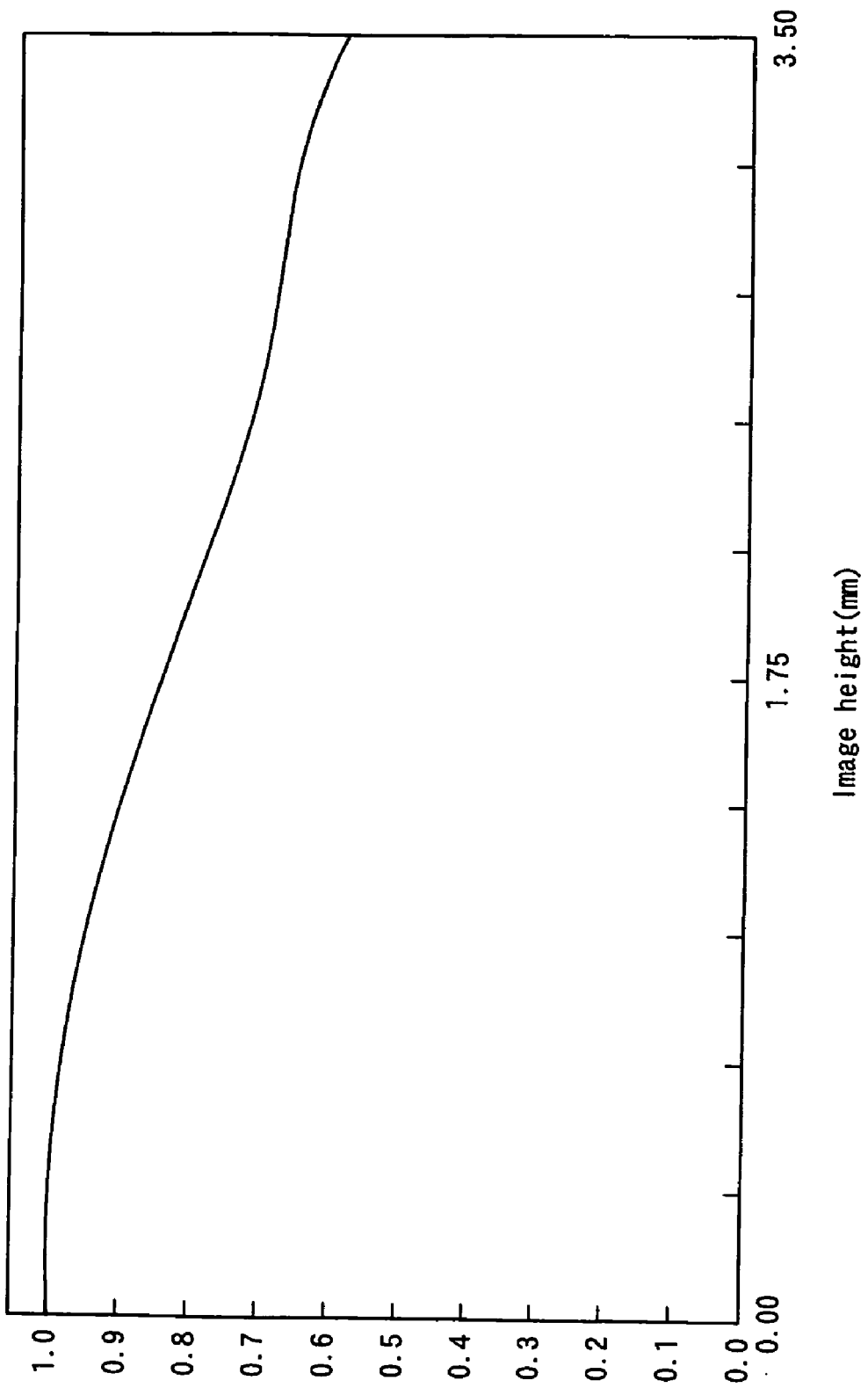
FIG. 6 is a graph of the relationship between the image height and the luminous flux of the image pickup lens of Example 1.

FIG. 6 is a graph of the relationship between the image height and the luminous flux of the image pickup lens 10 of Example 1 when the luminous flux is 1 at the center position. Generally, the luminous flux is highest at the center position and hence the image is light at the center. The luminous flux decreases as a function of the image height in the marginal area to make the image dark there. However, the image pickup lens 10 of Example 1 provides 50% or more at the 100% image height position out of the luminous flux at the center position as shown in FIG. 6. Thus, the image pickup lens 10 of Example 1 provides a sufficient degree of lightness.

Figure 7:
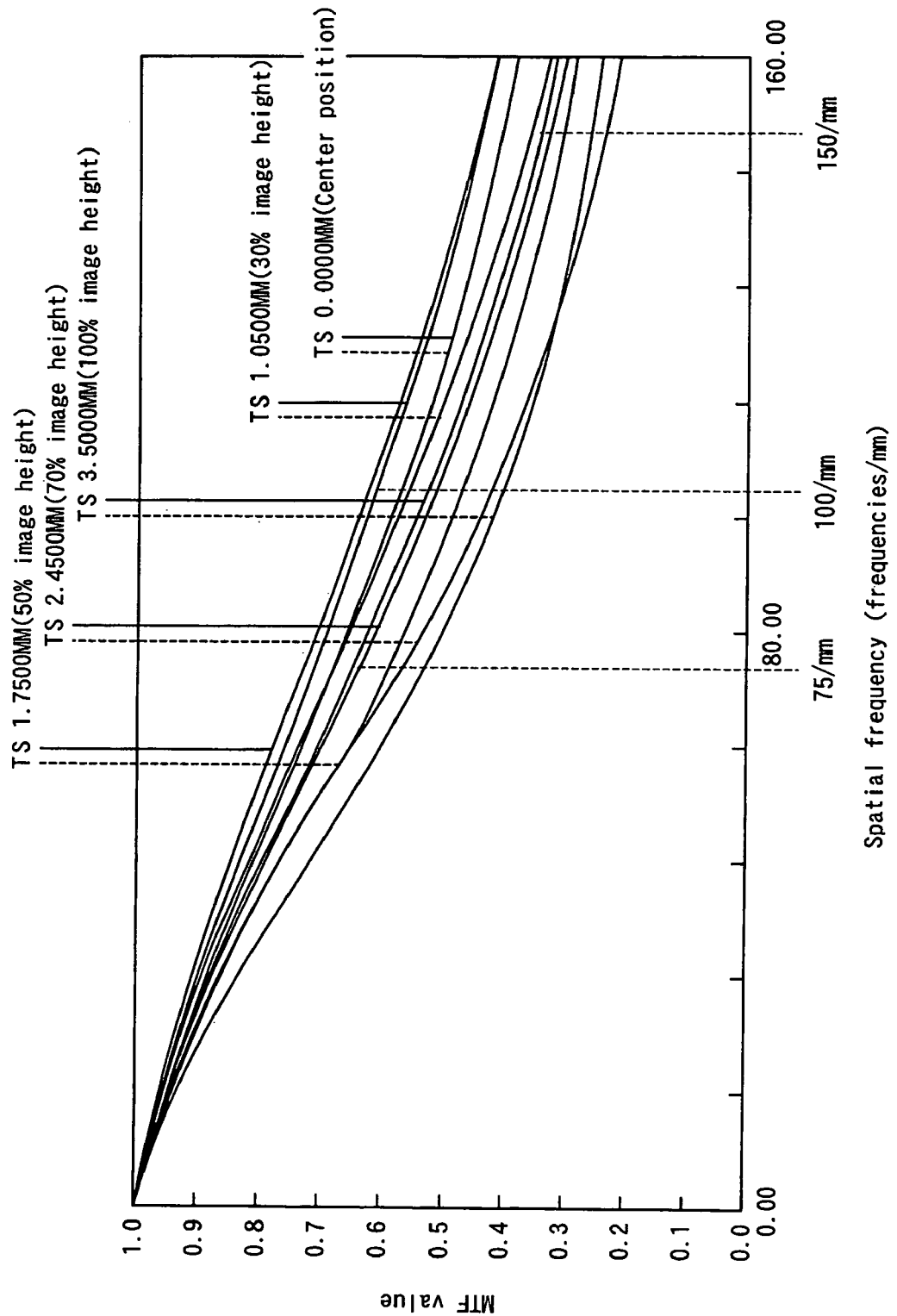
FIG. 7 is a graph of the MTF characteristics of the image pickup lens of Example 1.
Figure 8:
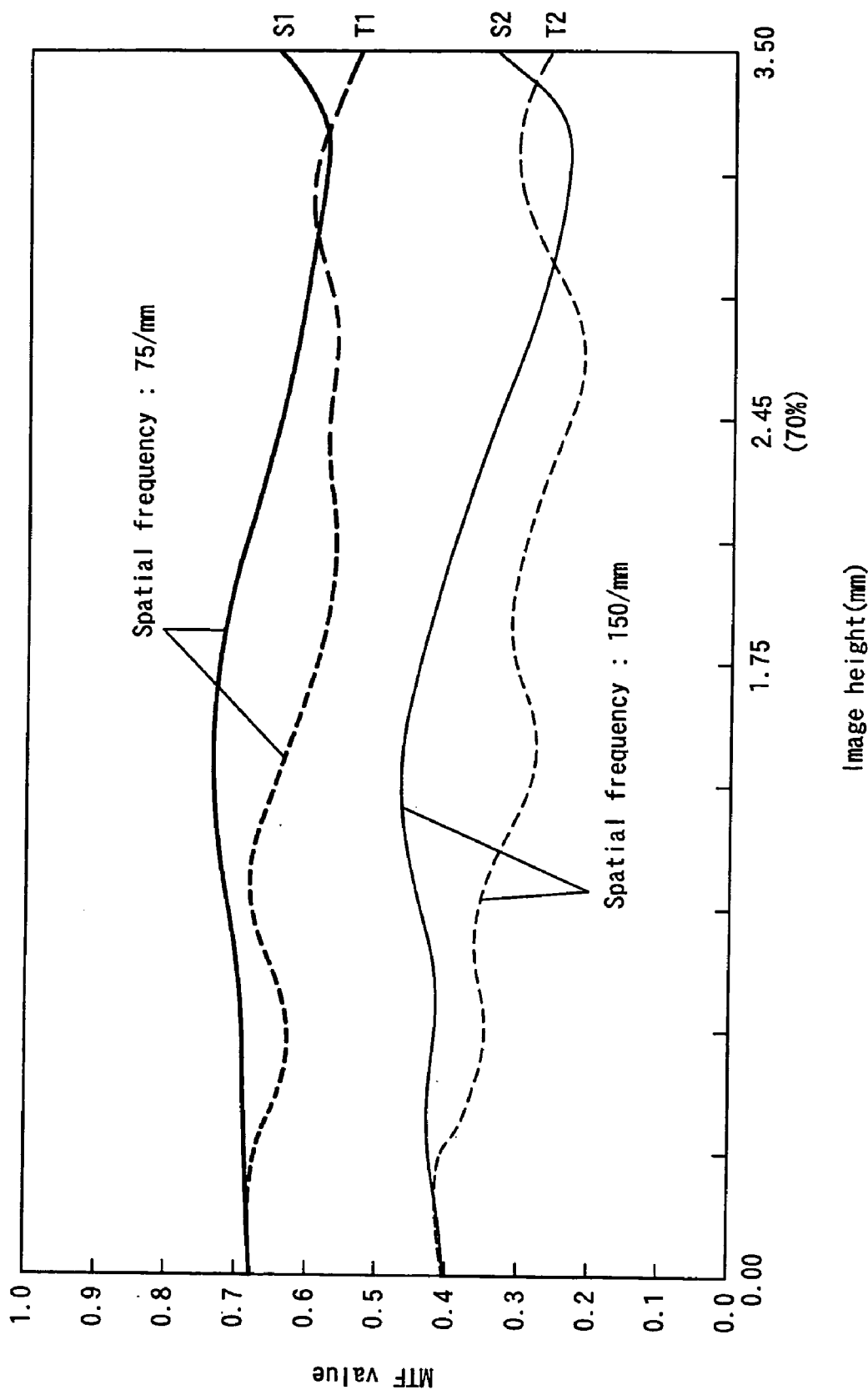
FIG. 8 is another graph of the MTF characteristics of the image pickup lens of Example 1.

Now, FIGS. 7 and 8 shows the MTF characteristics observed by means of the image pickup lens 10 of Example 1.

FIG. 7 is a graph illustrating the MTF characteristics of the sagittal image plane (indicated by solid lines S) and those of the tangential image plane (indicated by broken lines T) at the center position, at 30% image height position, at 50% image height position, at 70% image height position and at 100% image height position of the image plane 12a of the image pickup element 12. In FIG. 7, the horizontal axis represents the spatial frequency and the vertical axis represents the MTF value. It will be appreciated that the sagittal image plane and the tangential image plane show a same and identical MTF characteristic at the center position in FIG. 7 because they are rotationally symmetrical relative to the center position.

FIG. 8 is a graph illustrating the MTF characteristics in terms of the change in the MTF value relative to the image height when the spatial frequency is fixed to 75/mm and 150/mm. In FIG. 8, the horizontal axis represents the image height and the vertical axis represents the MTF value. It shows the MTF values on the sagittal image plane (indicated by solid line S1) and on the tangential image plane (indicated by broken line T1) when the spatial frequency is 75/mm and those on the sagittal image plane (indicated by solid line S2) and on the tangential image plane (indicated by broke line T2) when the spatial frequency is 150/mm.

As seen from FIG. 7, the MTF value of the image pickup lens 10 of Example 1 is about 0.4 (40%) at the center position when the spatial frequency is 160/mm so that the MTF value of the image pickup lens 10 is estimated to be about 0.3 (30%) at the center position when the spatial frequency is 200/mm. The MTF value of the image pickup lens 10 is about 0.6 (60%) at the center position when the spatial frequency is 100/mm, which remarkably exceeds the MTF design value of 30% when the spatial frequency is 200/mm and that of 50% when the spatial frequency is 100/mm shown in Table 1.

As seen from FIGS. 7 and 8, the MTF value of the image pickup lens 10 of Example 1 is about 0.25 (25%) at the 70% image height position on both the sagittal image plane and the tangential image plane when the spatial frequency is 150/mm and not less than 0.60 (60%) at the 70% image height position on both the sagittal image plane and the tangential image plane when the spatial frequency is 75/mm, both of which remarkably exceed the MTF design value of 25% for the spatial frequency of 150/mm and that of 40% for the spatial frequency of 75/mm.

Additionally, as seen from FIG. 8, the MTF value does not show any problem of a sudden fall between the center position and the 70% image height position. Rather, it will be seen that the image pickup lens 10 of Example 1 functions in such a way that the MTF value on the sagittal image plane and the MTF value on the tangential image plane show a difference that increases once but come to agree with each other above the 70% image height position for both the spatial frequency of 75/mm and the spatial frequency of 150/mm.

Thus, the resolving power of the image pickup lens 10 of Example 1 sufficiently satisfies the specified requirements for design shown in Table 1 so that the image pickup lens 10 can form a clear optical image on the image pickup plane 12a of an image pickup element 12 having a size of 1/2.7 inches and equipped with 3 million pixels.

EXAMPLE 2

Figure 9:
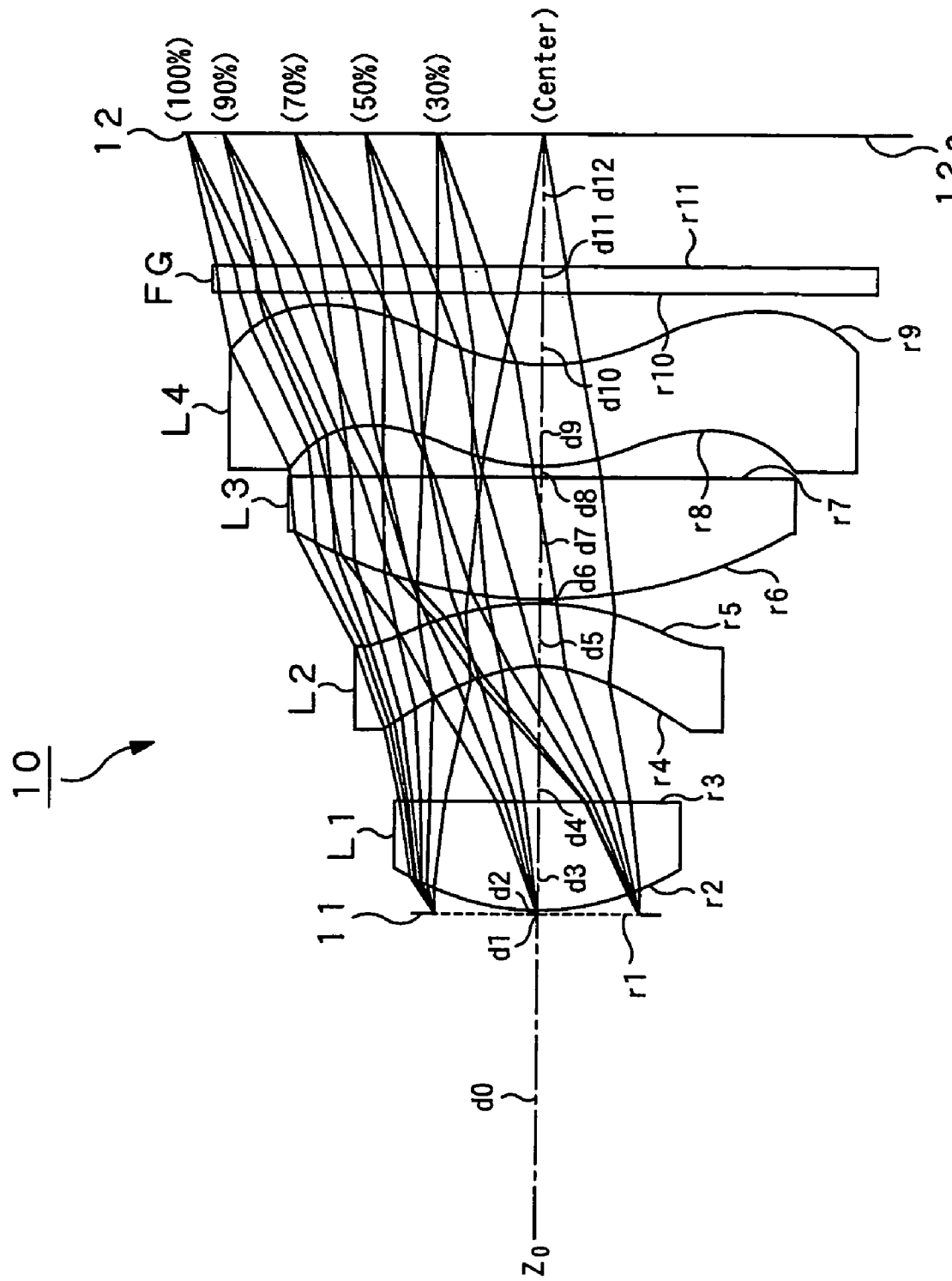
FIG. 9 is a schematic illustration of the configuration of the image pickup lens of Example 2.

FIG. 9 illustrates the image pickup lens 10 of Example 2. In FIG. 9, incident light fluxes that strike the image pickup lens 10 respectively at the center position (0.00 mm), at 30% image height position (1.05 mm), at 50% image height position (1.75 mm), at 70% image height position (2.45 mm), at 90% image height position (3.15 mm) and at 100% image height position (3.50 mm) are shown. Some of the design data of the image pickup lens 10 of Example 2 in FIG. 9 are shown in Table 4 below.

TABLE 4

| surface No. i | radius of curvature R | axial inter-surface distance d | focal distance Nd | Abbe number vd |
|---|---|---|---|---|
| \multicolumn{5}{|c|}{f = 5.68 mm FNo = 2.8 ω = 31.53°} |
| 0 | ∞ | 2086 | | |
| 1 | ∞ | 2.030 | | |
| 2 | 2.642 | 2.8 | 5.86 | 95.0 |
| 3 | −62.95 | 2.8 | | |
| 4 | −1.404 | 3.025 | | |
| 5 | −2.693 | 3.609 | | |
| 6 | 4.844 | 4.874 | 9.72 | 81.6 |
| 7 | ∞ | 4.962 | | |
| 8 | 1.584 | 4.970 | | |
| 9 | 1.437 | 6.144 | | |
| 10 | ∞ | 6.387 | | |
| 11 | ∞ | 6.470 | | |
| 12(IMG) | ∞ | 7.024 | | |

As shown in Table 4, the focal distance f of the entire optical system of the image pickup lens 10 of Example 2 is 5.68 mm and the F number FNo is 2.8, while the half view angle ω is 31.53°. It is also shown in Table 4 that the image pickup lens 10 of Example 2 is designed to satisfy all the above listed requirements of $vd_1 \geq 80$, $0.95f \leq f1 \leq 1.1f$, $vd_3 \geq 70$ and $1.5f \leq f3 \leq 2.5f$.

Table 5 below shows the conical constant K and the a spherical coefficients A, B, C, D and E of the fourth, sixth, eighth, tenth and twelfth orders that are necessary for computing the a spherical profiles of the surfaces r4 and r5 of the second lens L2 and those of the surfaces r8 and r9 of the fourth lens L4 by using the above-described equation (A), which lenses are glass-made a spherical lenses.

TABLE 5

| surface No. i | conical constant K | aspherical coefficients | | | | |
|---|---|---|---|---|---|---|
| | | A | B | C | D | E |
| 4 | −4.302 | $-1.76 \times 10^{-1}$ | $2.07 \times 10^{-1}$ | $-1.207 \times 10^{-1}$ | $3.545 \times 10^{-2}$ | $-4.15 \times 10^{-3}$ |
| 5 | −2.738 | $-8.646 \times 10^{-2}$ | $8.698 \times 10^{-2}$ | $-3.372 \times 10^{-2}$ | $6.374 \times 10^{-3}$ | $-4.616 \times 10^{-4}$ |
| 8 | −4.364 | $-4.009 \times 10^{-2}$ | $8.461 \times 10^{-3}$ | $-1.441 \times 10^{-3}$ | $6.666 \times 10^{-5}$ | 0 |
| 9 | −3.980 | $-2.411 \times 10^{-2}$ | $4.313 \times 10^{-3}$ | $-6.65 \times 10^{-4}$ | $4.547 \times 10^{-5}$ | $-1.228 \times 10^{-6}$ |

Figure 10:
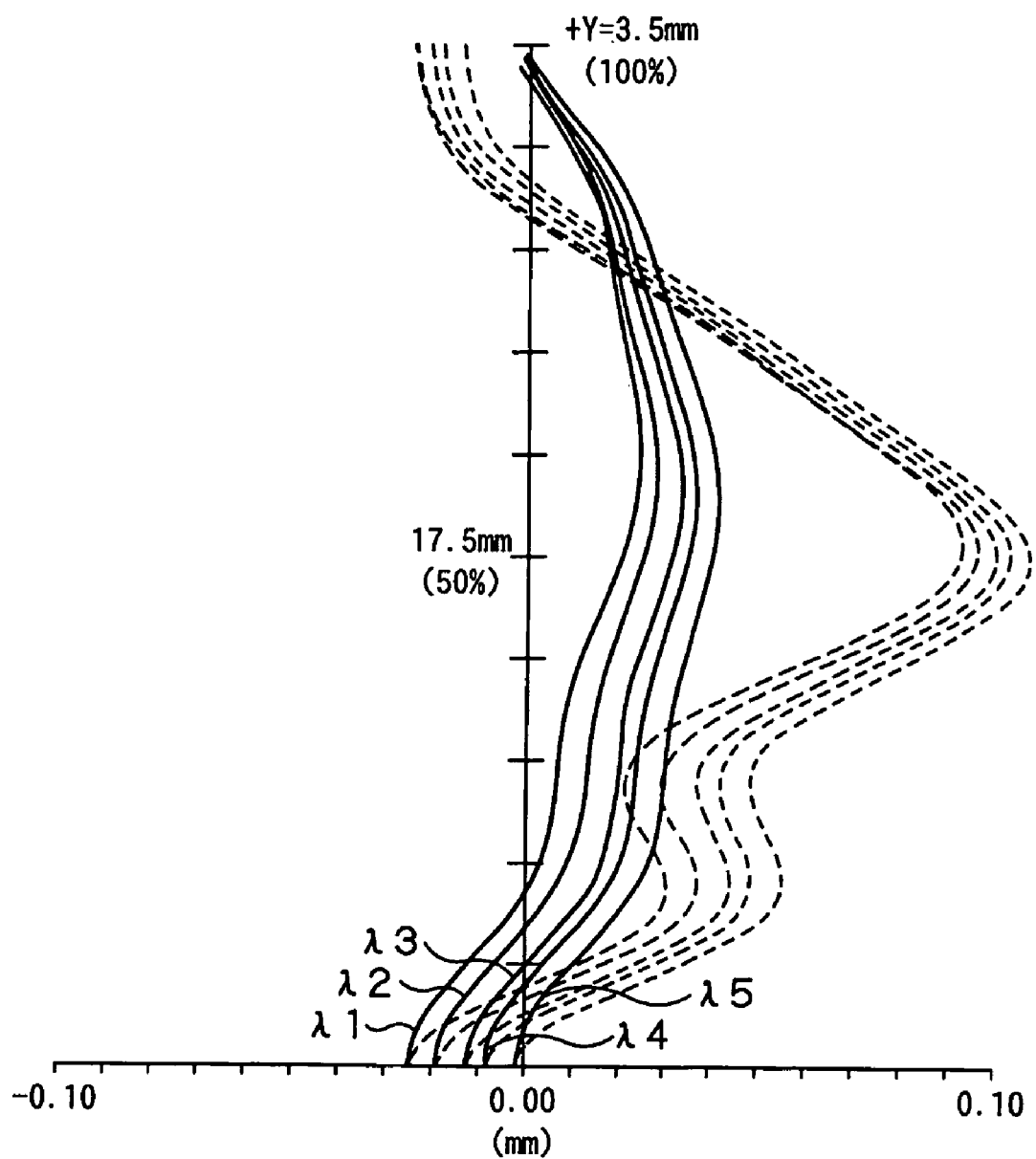
FIG. 10 is a graph of the astigmatism of the image pickup lens of Example 2.
Figure 11:
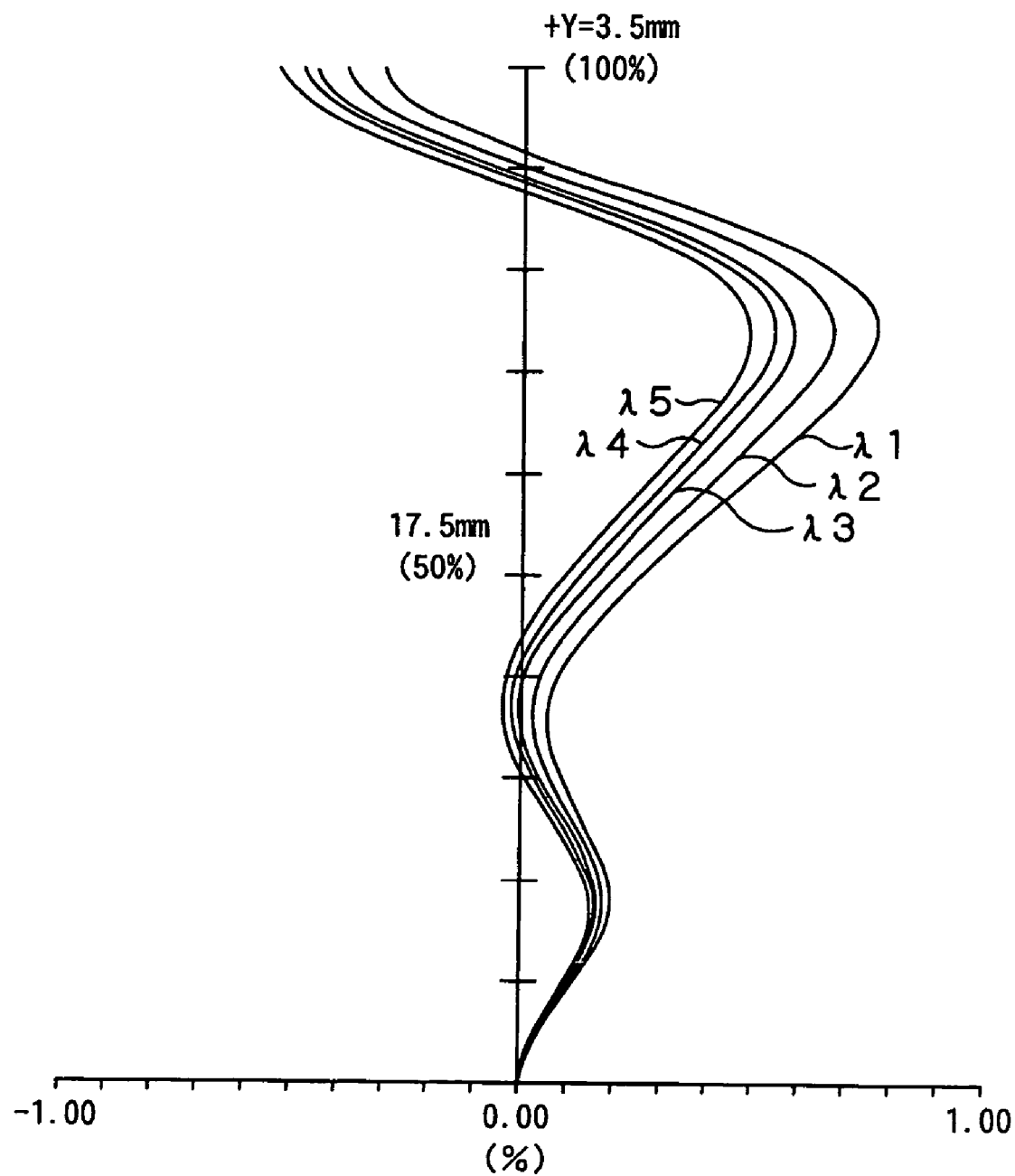
FIG. 11 is a graph of the distortion of the image pickup lens of Example 2.
Figure 12:
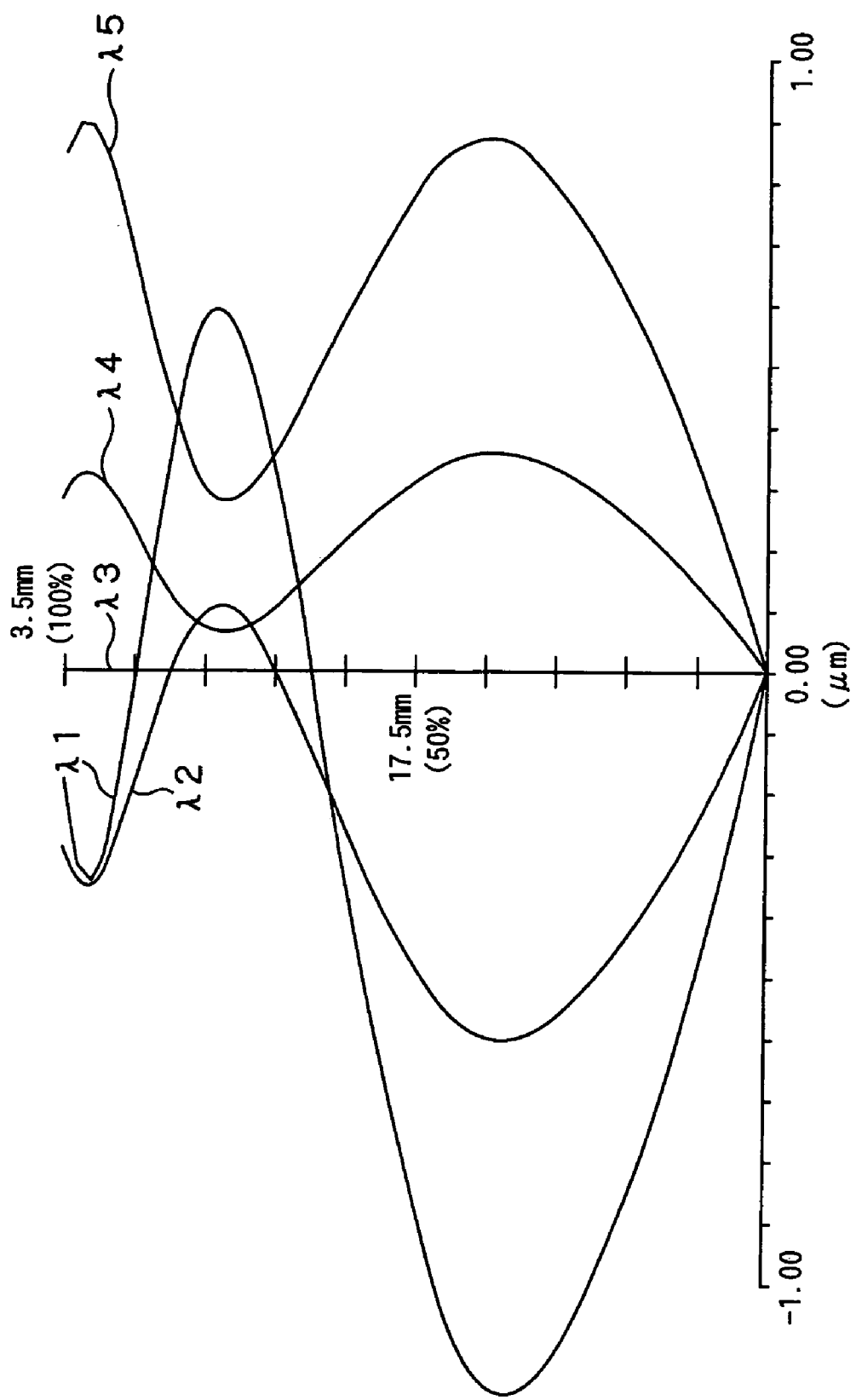
FIG. 12 is a graph of the chromatic difference of magnification of the image pickup lens of Example 2.

FIGS. 10, 11 and 12 show various aberrations of the image pickup lens 10 of Example 2 having the above-described configuration.

FIG. 10 shows the aberrations on the sagittal image plane (indicated by solid lines) and those on the tangential image plane (indicated by broken lines) for respective incident beams of light of wavelengths λ1 (0.436 μm), μ2 (0.486 μm), λ3 (0.546 μm), λ4 (0.588 μm) and λ5 (0.656 μm). As seen from FIG. 10, the image pickup lens 10 shows uniform aberrations and, while the aberrations on the sagittal image plane and those on the tangential image plane show large differences to raise the astigmatism at positions between the 40% image height and the 60% image height, the astigmatism is corrected once again at and near the 80% image height position.

FIG. 11 shows the distortions of the incident beams of light of wavelengths λ1, λ2, λ3, λ4 and λ5 that strike the image pickup lens 10 of Example 2. As seen from FIG. 1, the distortions of the above-cited wavelengths are found within 1%. In other words, they satisfy the requirement of 1 to 2% of the distortion tolerance for ordinary photography lenses so that the image pickup lens 10 of Example 2 can satisfactorily operate as image pickup lens in a digital still camera.

FIG. 12 shows the chromatic differences of magnification of the incident beams of light of wavelengths λ1, λ2, λ4 and λ5 that strike the image pickup lens 10 of Example 2, using the chromatic difference of magnification of the incident beam of wavelength λ3 as reference. As seen from FIG. 12, while the chromatic differences of magnification of the incident beams of light are largest at the 40% image height position, they substantially satisfy the tolerance of ±1 m so that the image pickup lens 10 of Example 2 can satisfactorily operate as image pickup lens in a digital still camera.

As seen from the graphs of FIGS. 10, 11 and 12, the image pickup lens 10 of Example 2 has an excellent aberration correcting function.

Figure 13:
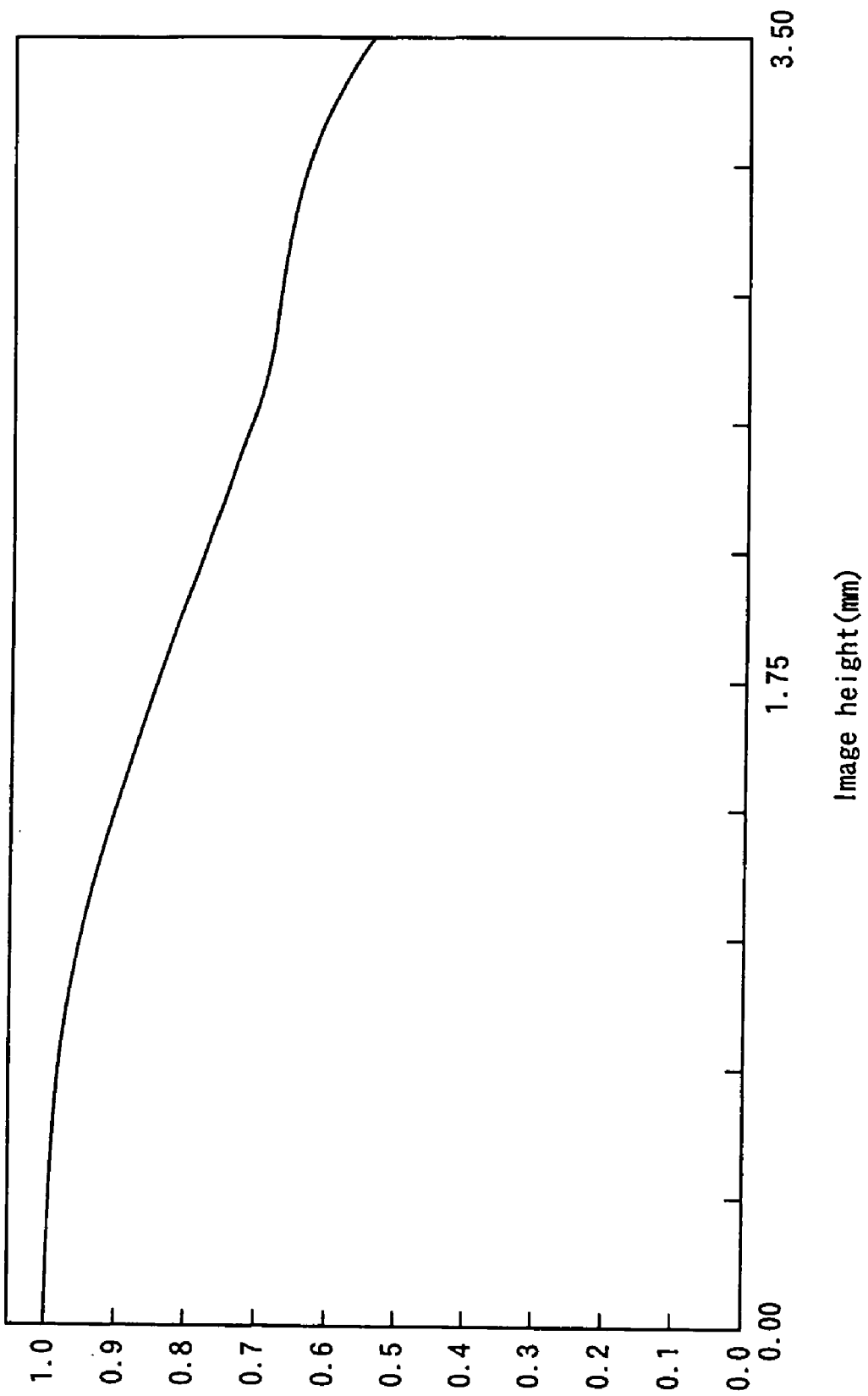
FIG. 13 is a graph of the relationship between the image height and the luminous flux of the image pickup lens of Example 2.

FIG. 13 is a graph of the relationship between the image height and the luminous flux of the image pickup lens 10 of Example 2 when the luminous flux is 1 at the center position. Generally, the luminous flux is highest at the center position and hence the image is light at the center. The luminous flux decreases as a function of the image height in the marginal area to make the image dark there. However, the image pickup lens 10 of Example 2 provides 50% or more at the 100% image height position out of the luminous flux at the center position as shown in FIG. 13. Thus, the image pickup lens 10 of Example 2 provides a sufficient degree of lightness.

Figure 14:
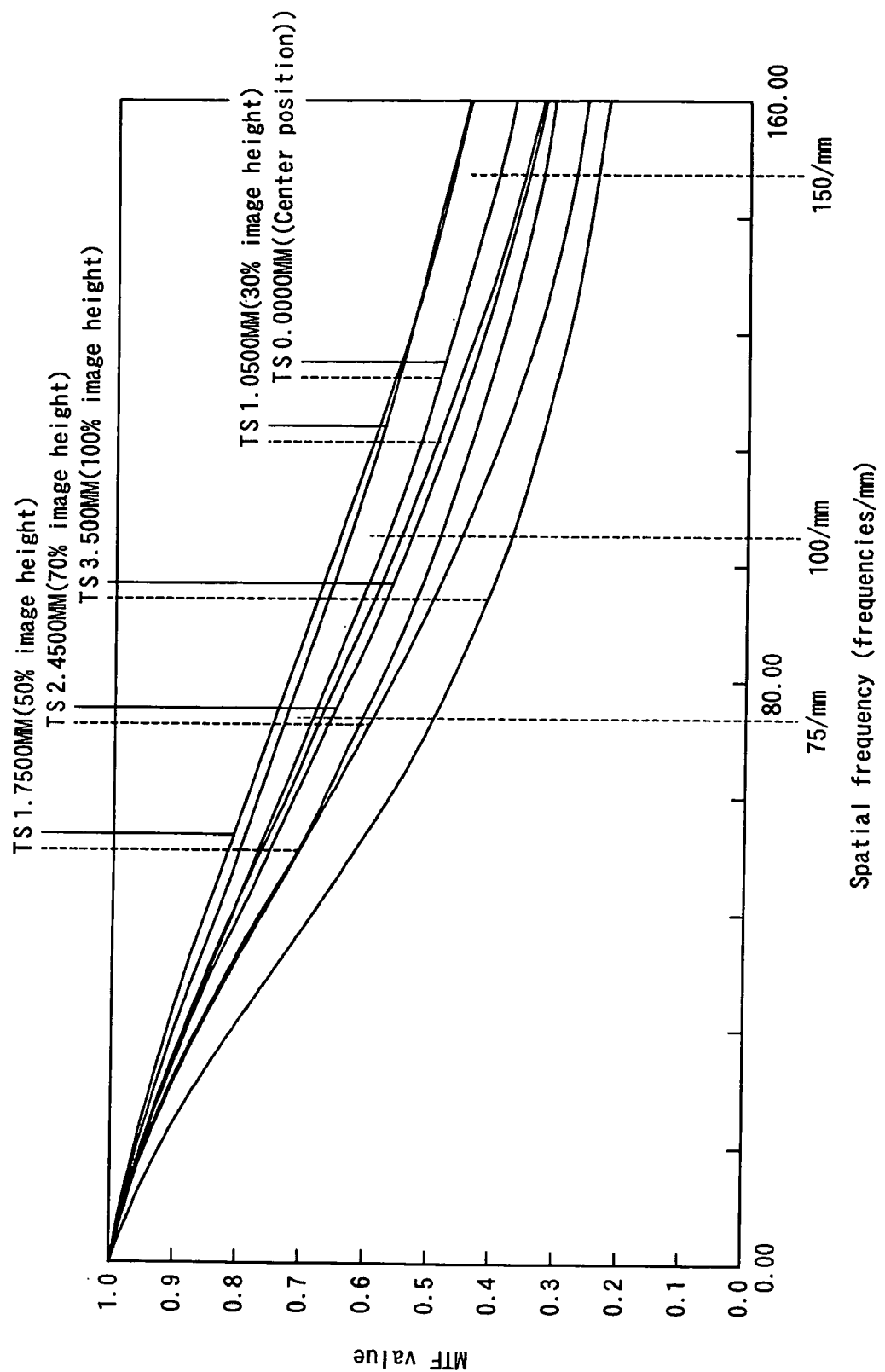
FIG. 14 is a graph of the MTF characteristics of the image pickup lens of Example 2.
Figure 15:
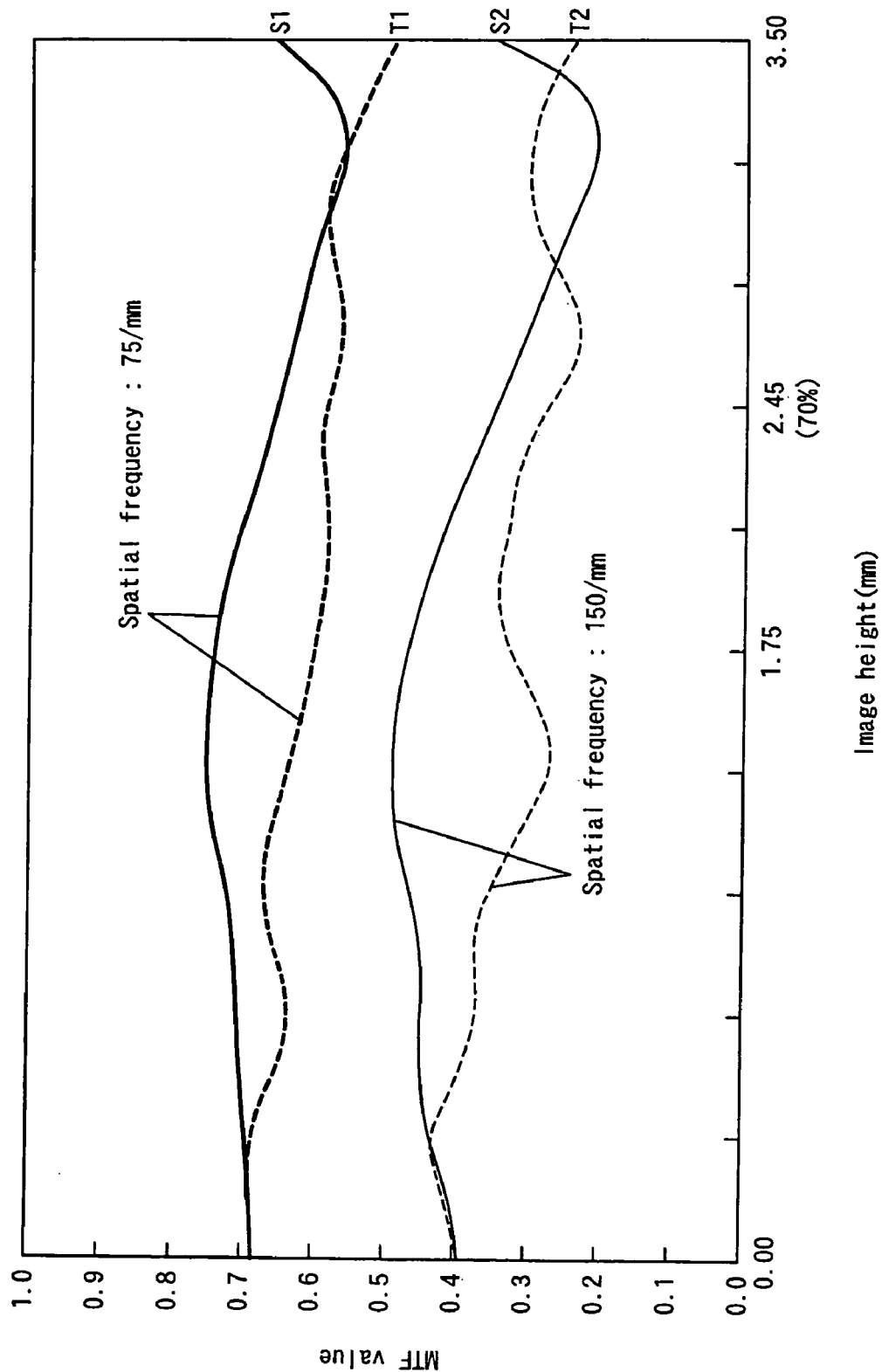
FIG. 15 is another graph of the MTF characteristics of the image pickup lens of Example 2.

Now, FIGS. 14 and 15 shows the MTF characteristics observed by means of the image pickup lens 10 of Example 2.

FIG. 14 is a graph illustrating the MTF characteristics of the sagittal image plane (indicated by solid lines S) and those of the tangential image plane (indicated by broken lines T) at the center position, at 30% image height position, at 50% image height position, at 70% image height position and at 100% image height position of the image plane 12a of the image pickup element 12. In FIG. 14, the horizontal axis represents the spatial frequency and the vertical axis represents the MTF value. It will be appreciated that the sagittal image plane and the tangential image plane show a same and identical MTF characteristic at the center position in FIG. 14 because they are rotationally symmetrical relative to the center position.

FIG. 15 is a graph illustrating the MTF characteristics in terms of the change in the MTF value relative to the image height when the spatial frequency is fixed to 75/mm and 150/mm. In FIG. 15, the horizontal axis represents the image height and the vertical axis represents the MTF value. It shows the MTF values on the sagittal image plane (indicated by solid line S1) and on the tangential image plane (indicated by broken line T1) when the spatial frequency is 75/mm and those on the sagittal image plane (indicated by solid line S2) and on the tangential image plane (indicated by broke line T2) when the spatial frequency is 150/mm.

As seen from FIG. 14, the MTF value of the image pickup lens 10 of Example 2 is about 0.4 (40%) at the center position when the spatial frequency is 160/mm so that the MTF value of the image pickup lens 10 is estimated to be about 0.3 (30%) at the center position when the spatial frequency is 200/mm. The MTF value of the image pickup lens 10 is about 0.5 (50%) at the center position when the spatial frequency is 100/mm, which remarkably exceeds the MTF design value of 30% when the spatial frequency is 200/mm and that of 50% when the spatial frequency is 100/mm shown in Table 1.

As seen from FIGS. 14 and 15, the MTF value of the image pickup lens 10 of Example 2 is about 0.25 (25%) at the 70% image height position on both the sagittal image plane and the tangential image plane when the spatial frequency is 150/mm and not less than 0.60 (60%) at the 70% image height position on both the sagittal image plane and the tangential image plane when the spatial frequency is 75/mm, both of which remarkably exceed the MTF design value of 25% for the spatial frequency of 150/mm and that of 40% for the spatial frequency of 75/mm.

Additionally, as seen from FIG. 15, the MTF value does not show any problem of a sudden fall between the center position and the 70% image height position. Rather, it will be seen that the image pickup lens 10 of Example 2 functions in such a way that the MTF value on the sagittal image plane and the MTF value on the tangential image plane show a difference that increases once but come to agree with each other above the 70% image height position for both the spatial frequency of 75/mm and the spatial frequency of 150/mm.

Thus, the resolving power of the image pickup lens 10 of Example 2 sufficiently satisfies the specified requirements for design shown in Table 1 so that the image pickup lens 10 can form a clear optical image on the image pickup plane 12a of an image pickup element 12 having a size of ½.7 inches and equipped with 3 million pixels.

EXAMPLE 3

Figure 16:
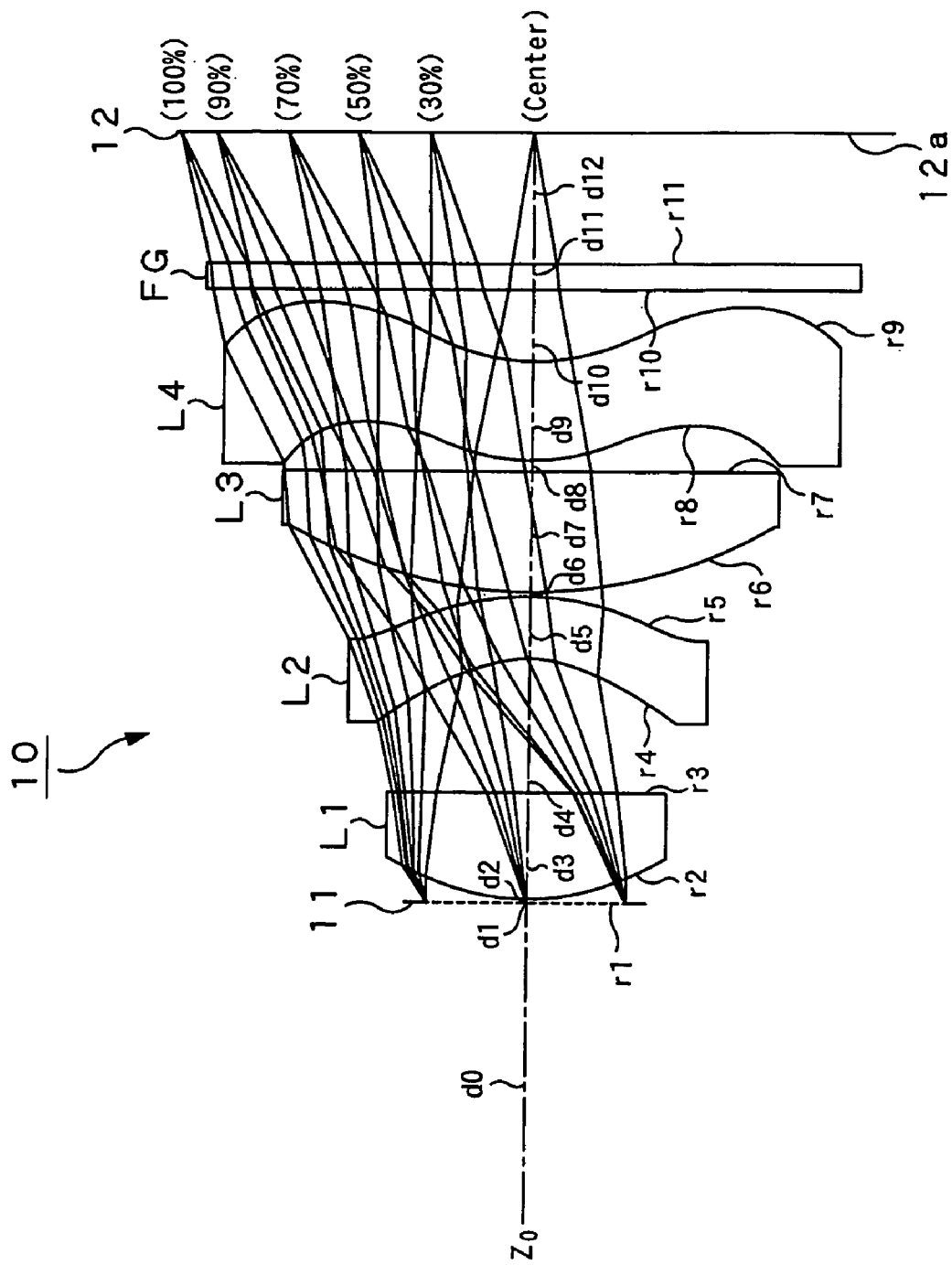
FIG. 16 is a schematic illustration of the configuration of the image pickup lens of Example 3.

FIG. 16 illustrates the image pickup lens 10 of Example 3. In FIG. 16, incident light fluxes that strike the image pickup lens 10 respectively at the center position (0.00 mm), at 30% image height position (1.05 mm), at 50% image height position (1.75 mm), at 70% image height position (2.45 mm), at 90% image height position (3.15 mm) and at 100% image height position (3.50 mm) are shown. Some of the design data of the image pickup lens 10 of Example 3 in FIG. 16 are shown in Table 6 below.

TABLE 6

| | f = 5.54 mm FNo = 2.8 ω = 32.2° | | | |
|---|---|---|---|---|
| surface No. i | radius of curvature R | axial inter-surface distance d | focal distance Nd | Abbe number vd |
| 0 | ∞ | 2141 | | |
| 1 | ∞ | 1.979 | | |
| 2 | 2.868 | 2.8 | 5.754 | 81.6 |
| 3 | ∞ | 2.8 | | |
| 4 | −1.432 | 2.961 | | |
| 5 | −3.029 | 3.541 | | |
| 6 | 4.686 | 4.927 | 9.40 | 81.6 |
| 7 | ∞ | 5.024 | | |
| 8 | 1.588 | 5.077 | | |
| 9 | 1.583 | 6.04 | | |
| 10 | ∞ | 6.328 | | |
| 11 | ∞ | 6.417 | | |
| 12(IMG) | ∞ | 7.011 | | |

As shown in Table 6, the focal distance f of the entire optical system of the image pickup lens 10 of Example 3 is 5.78 mm and the F number FNo is 2.8, while the half view angle ω is 32.2°. It is also shown in Table 6 that the image pickup lens 10 of Example 3 is designed to satisfy all the above listed requirements of $vd_1 \geq 80$, $0.95f \leq f1 \leq 1.1f$, $vd_3 \geq 70$ and $1.5 \leq f3 \leq 2.5f$.

Table 7 below shows the conical constant K and the aspherical coefficients A, B, C, D and E of the fourth, sixth, eighth, tenth and twelfth orders that are necessary for computing the aspherical profiles of the surfaces r4 and r5 of the second lens L2 and those of the surfaces r8 and r9 of the fourth lens L4 by using the above-described equation (A), which lenses are glass-made aspherical lenses.

Figure 21:
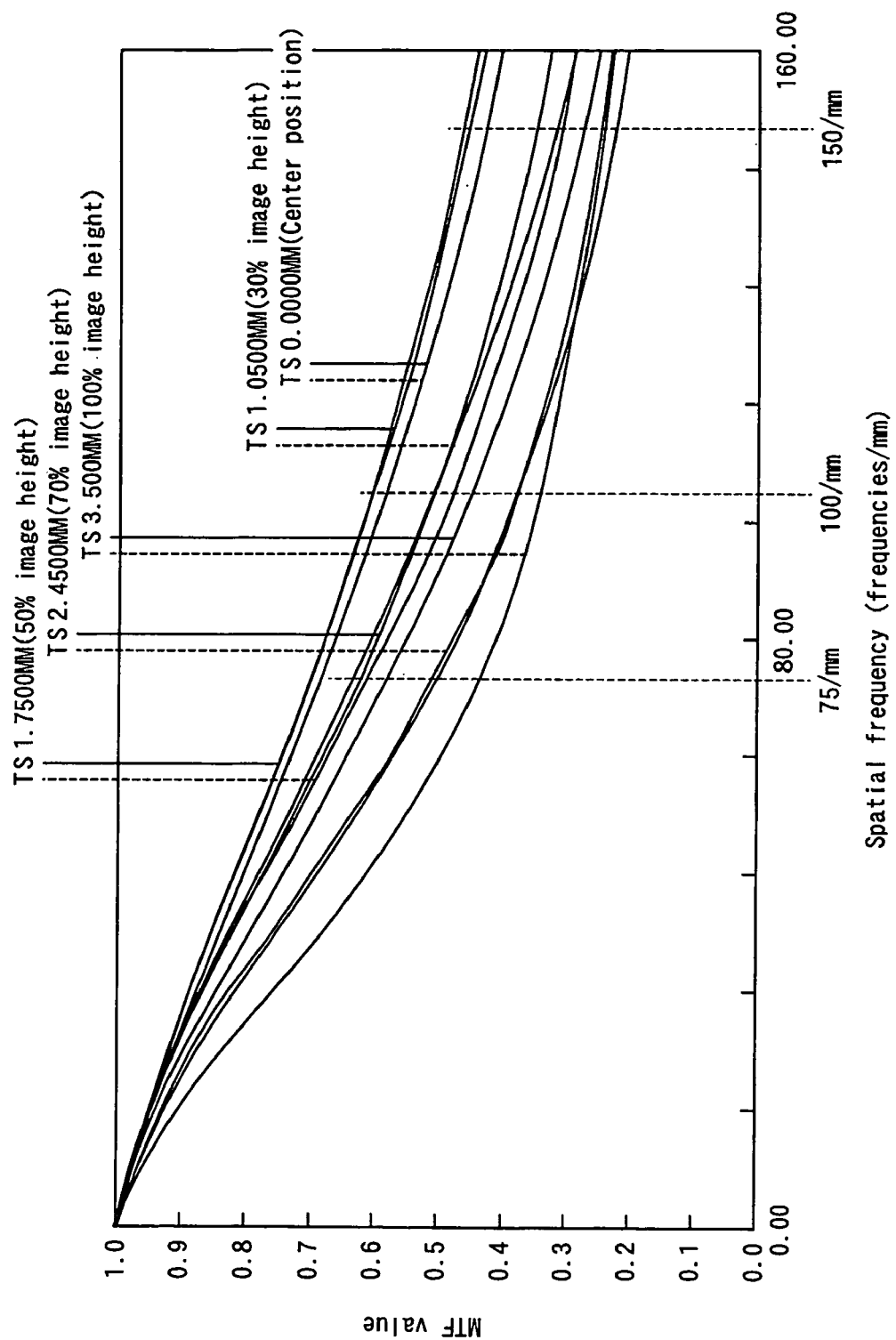
FIG. 21 is a graph of the MTF characteristics of the image pickup lens of Example 3.
Figure 22:
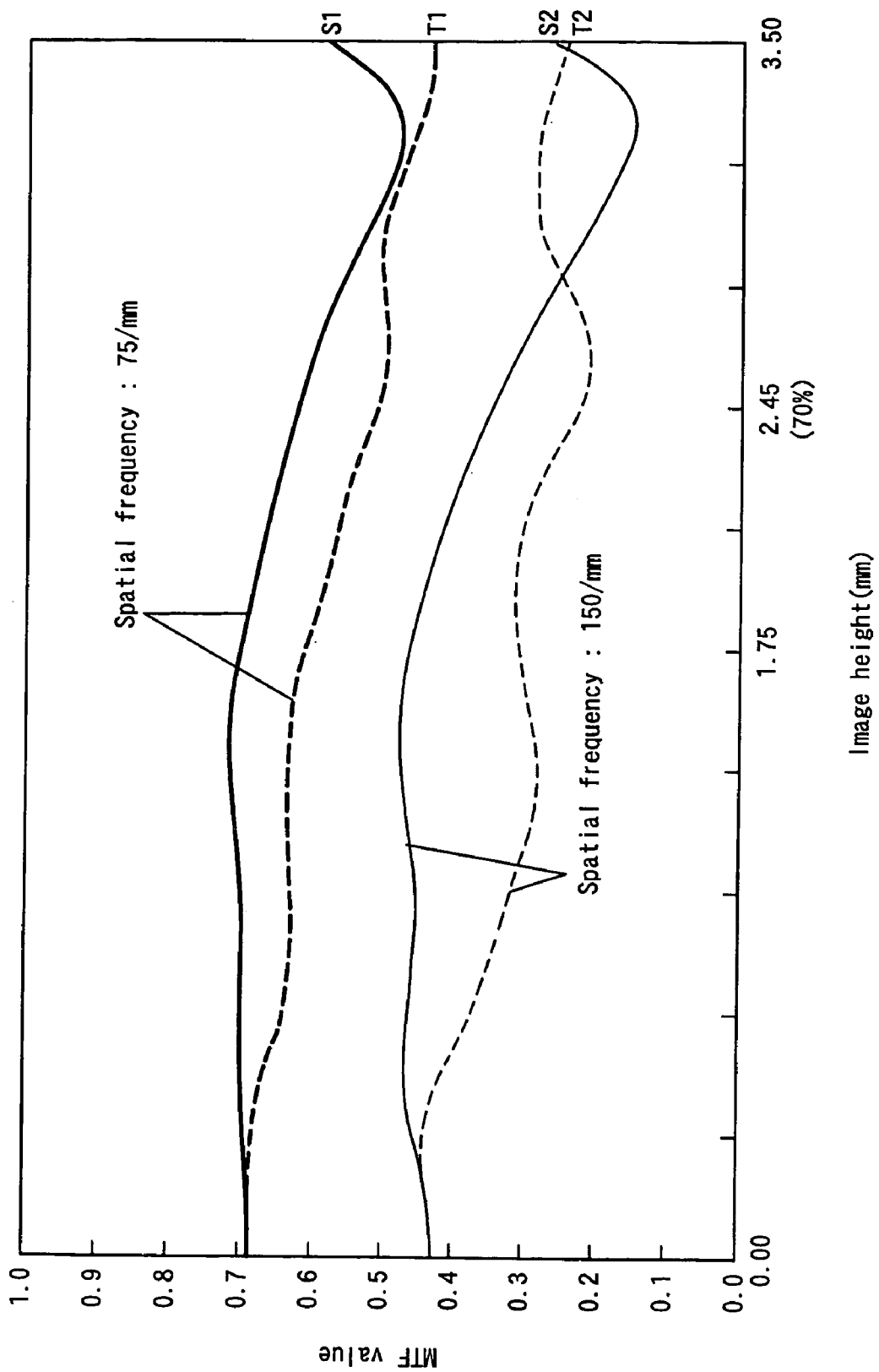
FIG. 22 is another graph of the MTF characteristics of the image pickup lens of Example 3.

Now, FIGS. 21 and 22 show the MTF characteristics observed by means of the image pickup lens 10 of Example 3.

FIG. 21 is a graph illustrating the MTF characteristics of the sagittal image plane (indicated by solid lines S) and those

TABLE 7

| surface No. | conical constant | aspherical coefficients | | | | |
|---|---|---|---|---|---|---|
| i | K | A | B | C | D | E |
| 4 | −4.228 | $-1.527 \times 10^{-1}$ | $2.029 \times 10^{-1}$ | $-1.216 \times 10^{-1}$ | $3.667 \times 10^{-2}$ | $-4.472 \times 10^{-3}$ |
| 5 | −4.529 | $-7.951 \times 10^{-2}$ | $8.644 \times 10^{-2}$ | $-3.376 \times 10^{-2}$ | $6.575 \times 10^{-3}$ | $-5.124 \times 10^{-4}$ |
| 8 | −3.909 | $-3.285 \times 10^{-2}$ | $6.551 \times 10^{-3}$ | $-1.214 \times 10^{-3}$ | $6.71 \times 10^{-5}$ | 0 |
| 9 | −3.831 | $-2.229 \times 10^{-2}$ | $3.662 \times 10^{-3}$ | $-6.196 \times 10^{-4}$ | $4.781 \times 10^{-5}$ | $-1.385 \times 10^{-6}$ |

Figure 17:
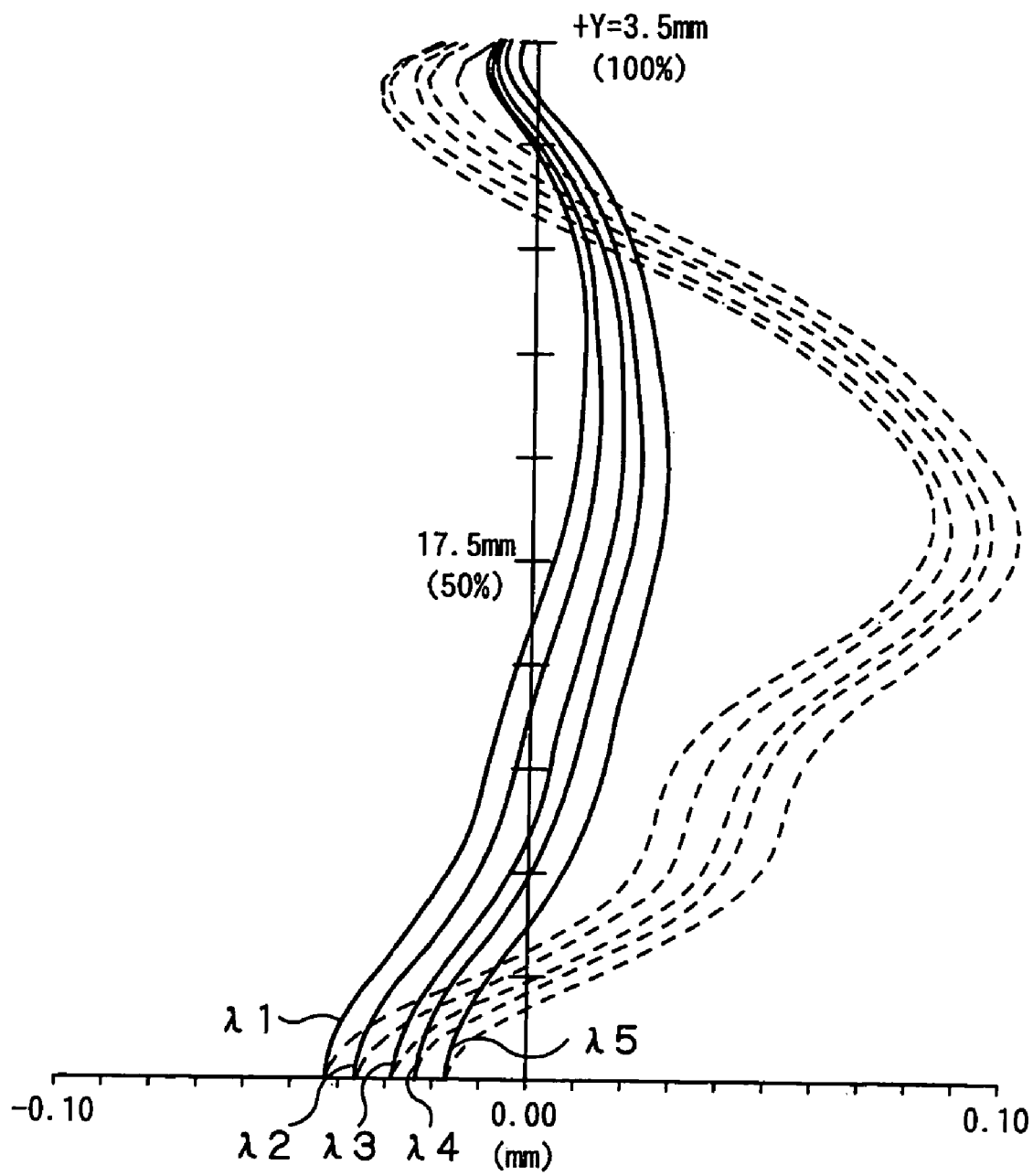
FIG. 17 is a graph of the astigmatism of the image pickup lens of Example 3.
Figure 18:
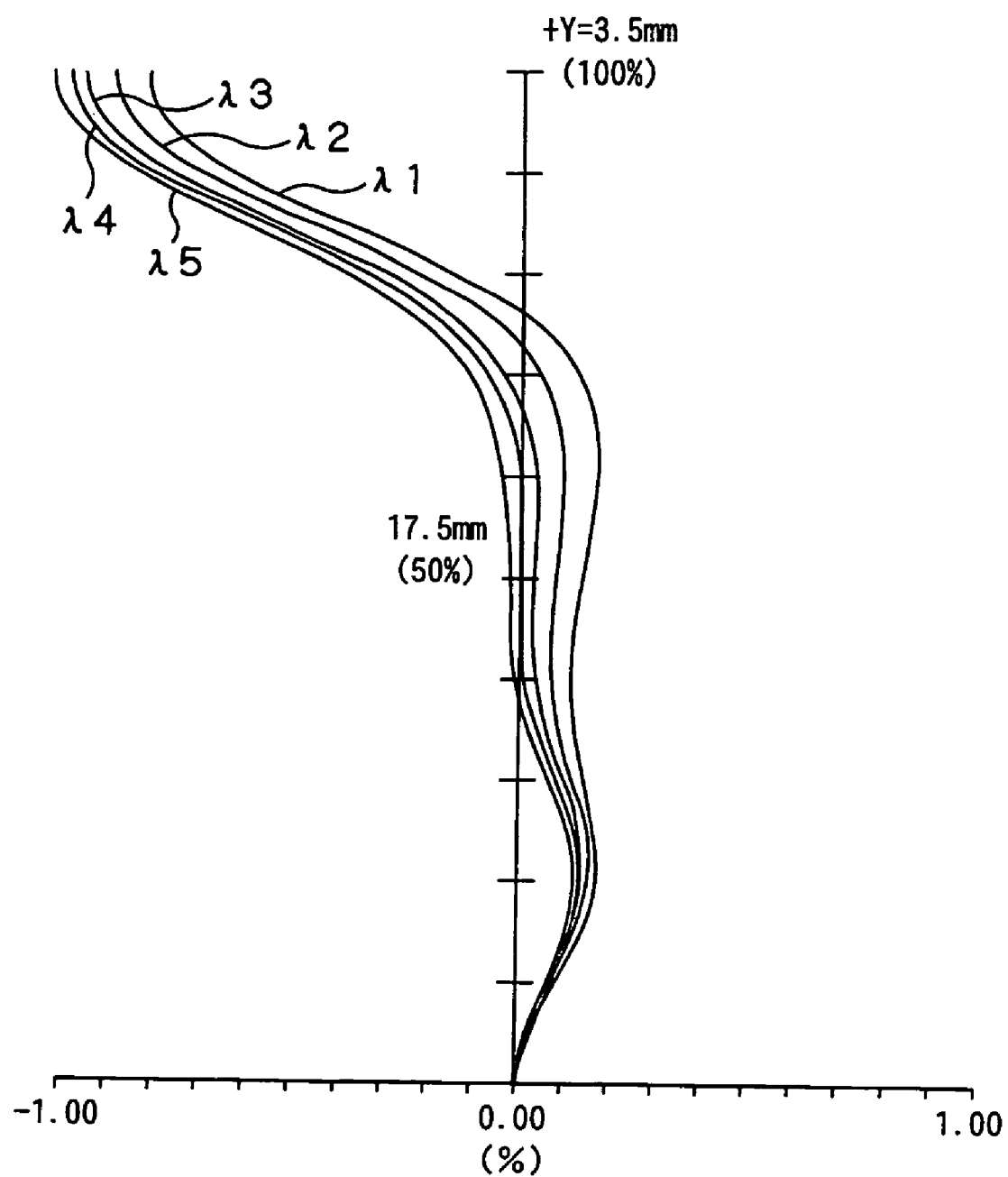
FIG. 18 is a graph of the distortion of the image pickup lens of Example 3.
Figure 19:
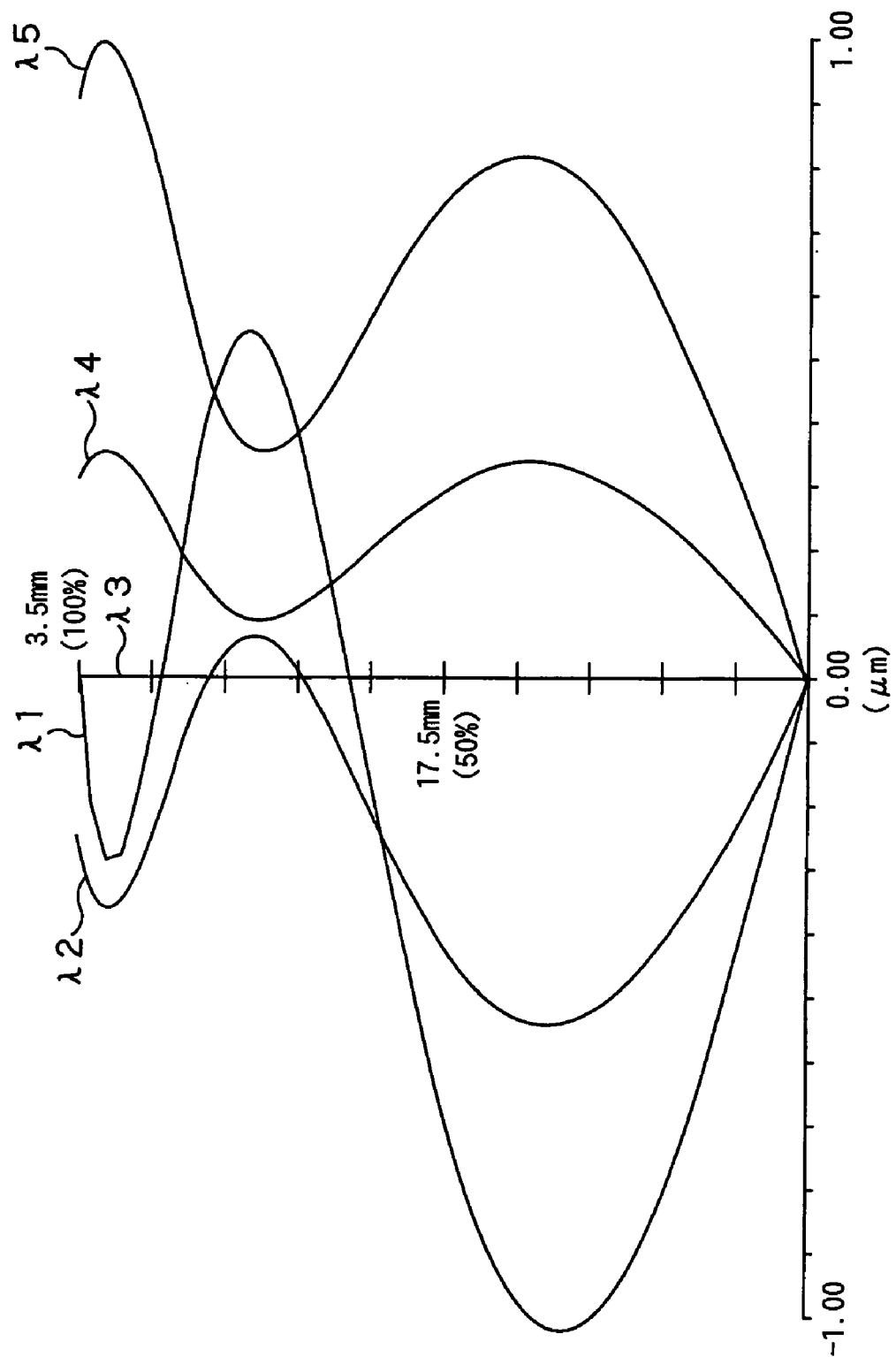
FIG. 19 is a graph of the chromatic difference of magnification of the image pickup lens of Example 3.

FIGS. 17, 18 and 19 show various aberrations of the image pickup lens 10 of Example 3 having the above-described configuration.

FIG. 17 shows the aberrations on the sagittal image plane (indicated by solid lines) and those on the tangential image plane (indicated by broken lines) for respective incident beams of light of wavelengths $\lambda 1$ (0.436 μm), $\lambda 2$ (0.486 μm), $\lambda 3$ (0.546 μm), $\lambda 4$ (0.588 μm) and $\lambda 5$ (0.656 μm). As seen from FIG. 17, the image pickup lens 10 shows uniform aberrations and, while the aberrations on the sagittal image plane and those on the tangential image plane show large differences to raise the astigmatism at positions between the 20% image height and the 80% image height, the astigmatism is corrected once again at and near the 90% image height position.

FIG. 18 shows the distortions of the incident beams of light of wavelengths $\lambda 1$, $\lambda 2$, $\lambda 3$, $\lambda 4$ and $\lambda 5$ that strike the image pickup lens 10 of Example 3. As seen from FIG. 18, the distortions of the above cited wavelengths are found within 1%. In other words, they satisfy the requirement of 1 to 2% of the distortion tolerance for ordinary photography lenses so that the image pickup lens 10 of Example 3 can satisfactorily operate as image pickup lens in a digital still camera.

FIG. 19 shows the chromatic differences of magnification of the incident beams of light of wavelengths $\lambda 1$, $\lambda 2$, $\lambda 4$ and $\lambda 5$ that strike the image pickup lens 10 of Example 3, using the chromatic difference of magnification of the incident beam of wavelength $\lambda 3$ as reference. As seen from FIG. 19, while the chromatic differences of magnification of the incident beams of light are largest at the 30% image height position, they substantially satisfy the tolerance of ±1 μm so that the image pickup lens 10 of Example 3 can satisfactorily operate as image pickup lens in a digital still camera.

As seen from the graphs of FIGS. 17, 18 and 19, the image pickup lens 10 of Example 3 has an excellent aberration correcting function.

Figure 20:
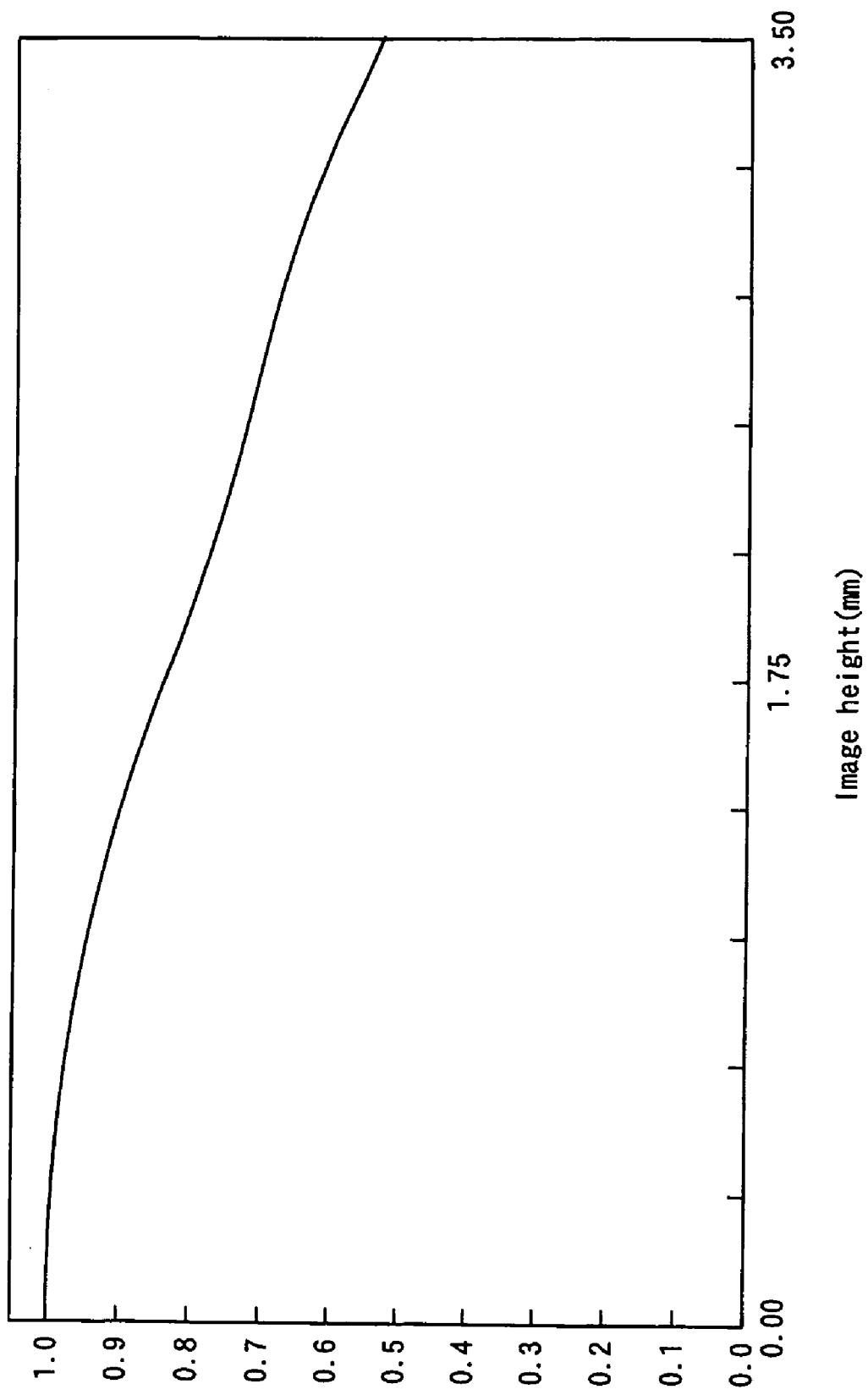
FIG. 20 is a graph of the relationship between the image height and the luminous flux of the image pickup lens of Example 3.

FIG. 20 is a graph of the relationship between the image height and the luminous flux of the image pickup lens 10 of Example 3 when the luminous flux is 1 at the center position. Generally, the luminous flux is highest at the center position and hence the image is light at the center. The luminous flux decreases as a function of the image height in the marginal area to make the image dark there. However, the image pickup lens 10 of Example 3 provides 50% or more at the 100% image height position out of the luminous flux at the center position as shown in FIG. 20. Thus, the image pickup lens 10 of Example 3 provides a sufficient degree of lightness.

of the tangential image plane (indicated by broken lines T) at the center position, at 30% image height position, at 50% image height position, at 70% image height position and at 100% image height position of the image plane 12a of the image pickup element 12. In FIG. 21, the horizontal axis represents the spatial frequency and the vertical axis represents the MTF value. It will be appreciated that the sagittal image plane and the tangential image plane show a same and identical MTF characteristic at the center position in FIG. 21 because they are rotationally symmetrical relative to the center position.

FIG. 22 is a graph illustrating the MTF characteristics in terms of the change in the MTF value relative to the image height when the spatial frequency is fixed to 75/mm and 150/mm. In FIG. 22, the horizontal axis represents the image height and the vertical axis represents the MTF value. It shows the MTF values on the sagittal image plane (indicated by solid line S1) and on the tangential image plane (indicated by broken line T1) when the spatial frequency is 75/mm and those on the sagittal image plane (indicated by solid line S2) and on the tangential image plane (indicated by broke line T2) when the spatial frequency is 150/mm.

As seen from FIG. 21, the MTF value of the image pickup lens 10 of Example 3 is about 0.4 (40%) at the center position when the spatial frequency is 160/mm so that the MTF value of the image pickup lens 10 is estimated to be about 0.3 (30%) at the center position when the spatial frequency is 200/mm. The MTF value of the image pickup lens 10 is about 0.5 (50%) at the center position when the spatial frequency is 100/mm, which remarkably exceeds the MTF design value of 30% when the spatial frequency is 200/mm and that of 50% when the spatial frequency is 100/mm shown in Table 1.

As seen from FIGS. 21 and 22, the MTF value of the image pickup lens 10 of Example 3 is about 0.25 (25%) at the 70% image height position on both the sagittal image plane and the tangential image plane when the spatial frequency is 150/mm and not less than 0.55 (55%) at the 70% image height position on both the sagittal image plane and the tangential image plane when the spatial frequency is 75/mm, both of which remarkably exceed the MTF design value of 25% for the spatial frequency of 150/mm and that of 40% for the spatial frequency of 75/mm.

Additionally, as seen from FIG. 22, the MTF value does not show any problem of a sudden fall between the center position and the 70% image height position. Rather, it will be seen that the image pickup lens 10 of Example 3 functions in such a way that the MTF value on the sagittal image plane and the MTF value on the tangential image plane show a difference that increases once but come to agree with each other above the 70% image height position for both the spatial frequency of 75/mm and the spatial frequency of 150/mm.

Thus, the resolving power of the image pickup lens 10 of Example 3 sufficiently satisfies the specified requirements for design shown in Table 1 so that the image pickup lens 10 can form a clear optical image on the image pickup plane 12a of an image pickup element 12 having a size of ½.7 inches and equipped with 3 million pixels.

EXAMPLE 4

Figure 23:
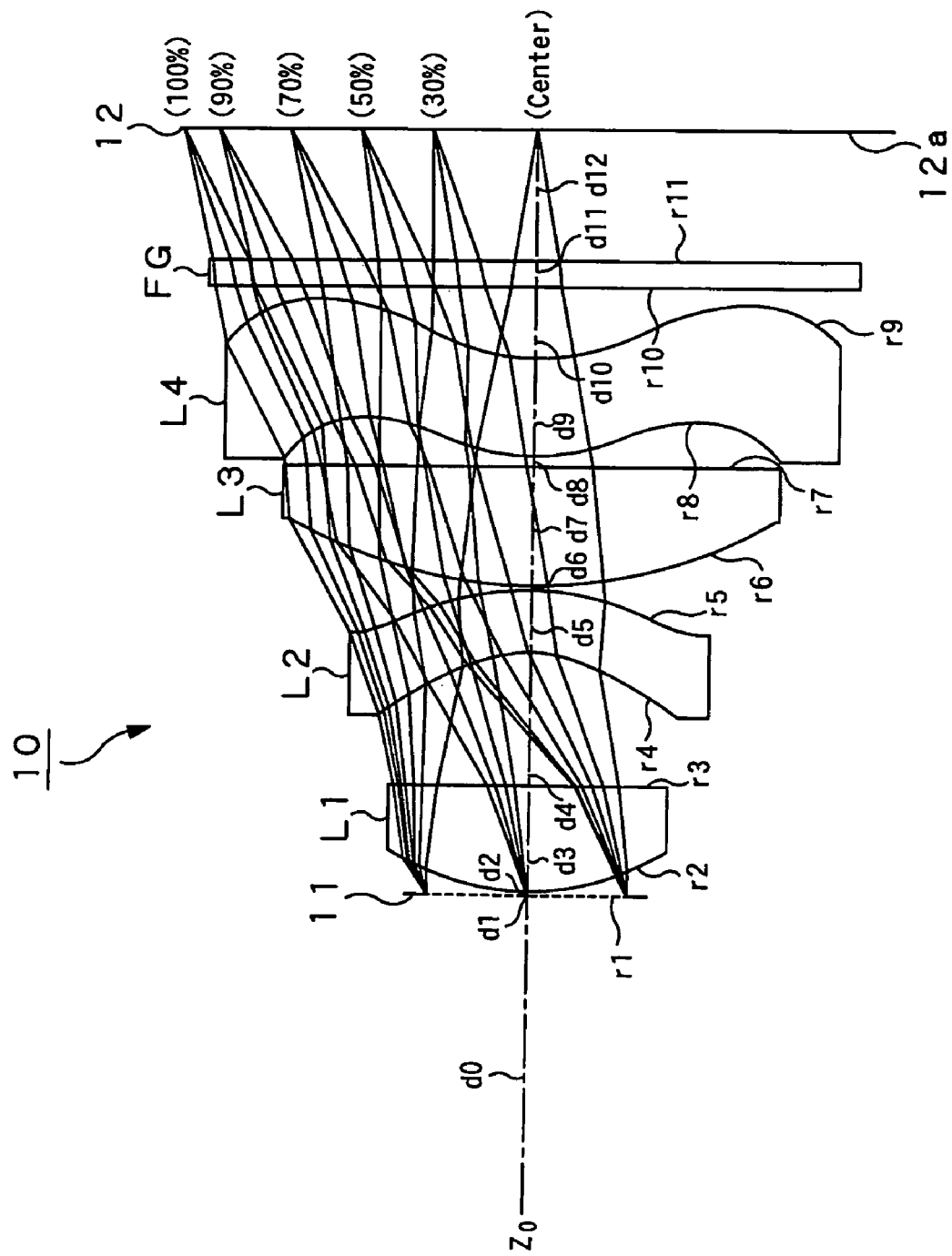
FIG. 23 is a schematic illustration of the configuration of the image pickup lens of Example 4.

FIG. 23 illustrates the image pickup lens 10 of Example 4. In FIG. 23, incident light fluxes that strike the image pickup lens 10 respectively at the center position (0.00 mm), at 30% image height position (1.05 mm), at 50% image height position (1.75 mm), at 70% image height position (2.45 mm), at 90% image height position (3.15 mm) and at 100% image height position (3.50 mm) are shown. Some of the design data of the image pickup lens 10 of Example 4 in FIG. 23 are shown in Table 8 below.

TABLE 8 f = 5.74 mm FNo = 2.8 ω = 31.3°

| surface No. i | radius of curvature R | axial inter-surface distance d | focal distance Nd | Abbe number vd |
|---|---|---|---|---|
| 0 | ∞ | 2064 | | |
| 1 | ∞ | 2.052 | | |
| 2 | 2.534 | 2.8 | 5.83 | 95.0 |
| 3 | ∞ | 2.8 | | |
| 4 | −1.479 | 3.007 | | |
| 5 | −3.04 | 3.568 | | |
| 6 | 4.808 | 4.947 | 13.07 | 81.6 |
| 7 | 16.95 | 5.057 | | |
| 8 | 1.462 | 5.075 | | |
| 9 | 1.475 | 6.107 | | |
| 10 | ∞ | 6.359 | | |
| 11 | ∞ | 6.448 | | |
| 12(IMG) | ∞ | 7.041 | | |

As shown in Table 8, the focal distance f of the entire optical system of the image pickup lens 10 of Example 4 is 5.74 mm and the F number FNo is 2.8, while the half view angle ω is 31.3°. It is also shown in Table 8 that the image pickup lens 10 of Example 4 is designed to satisfy all the above listed requirements of $vd_1 \geq 80$, $0.95 \leq f1 \leq 1.1f$, $vd_3 \geq 70$ and $1.5 \leq f3 \leq 2.5f$.

Table 9 below shows the conical constant K and the aspherical coefficients A, B, C, D and E of the fourth, sixth, eighth, tenth and twelfth orders that are necessary for computing the aspherical profiles of the surfaces r4 and r5 of the second lens L2 and those of the surfaces r8 and r9 of the fourth lens L4 by using the above-described equation (A), which lenses are glass-made aspherical lenses.

Figure 24:
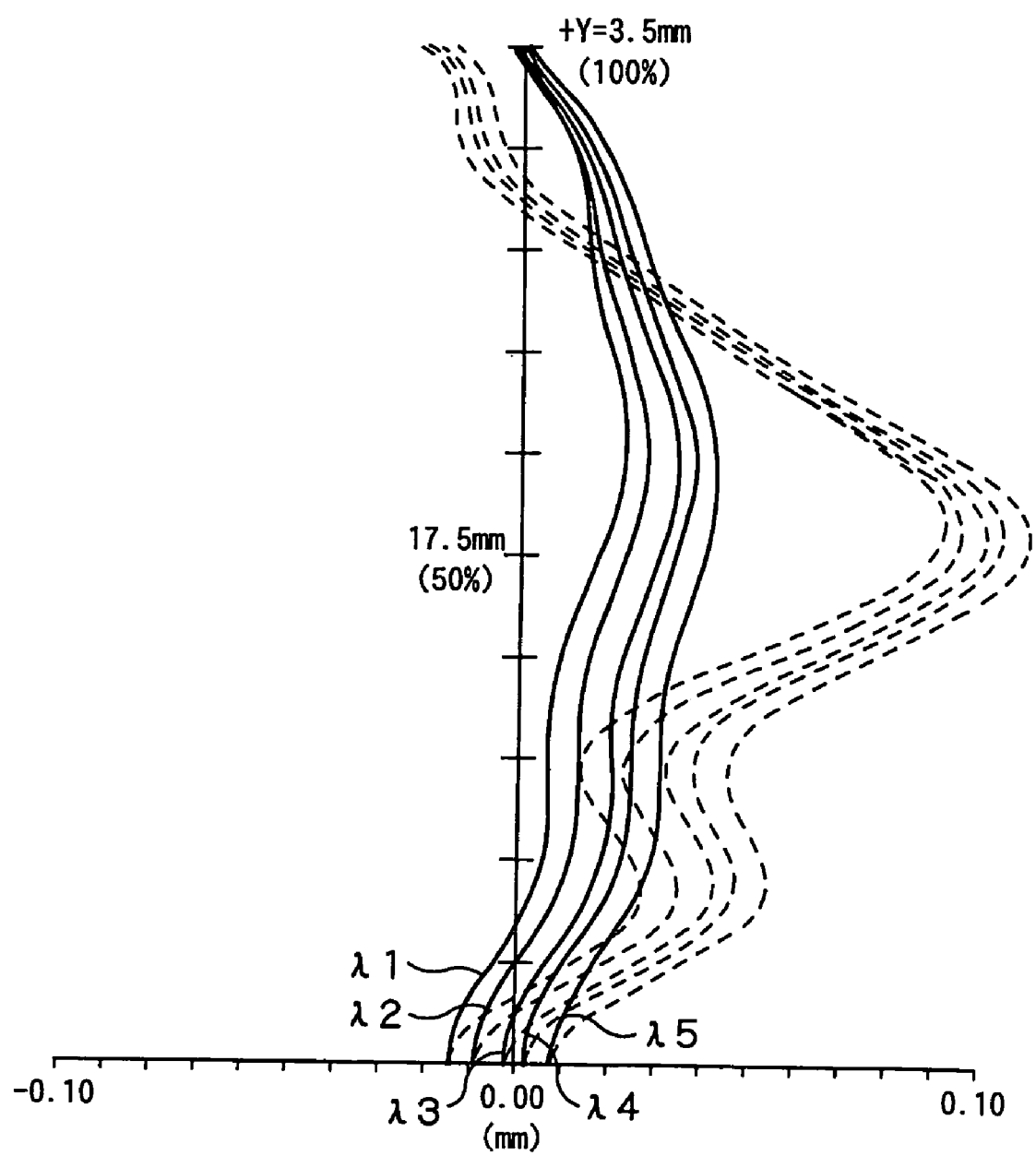
FIG. 24 is a graph of the astigmatism of the image pickup lens of Example 4.
Figure 25:
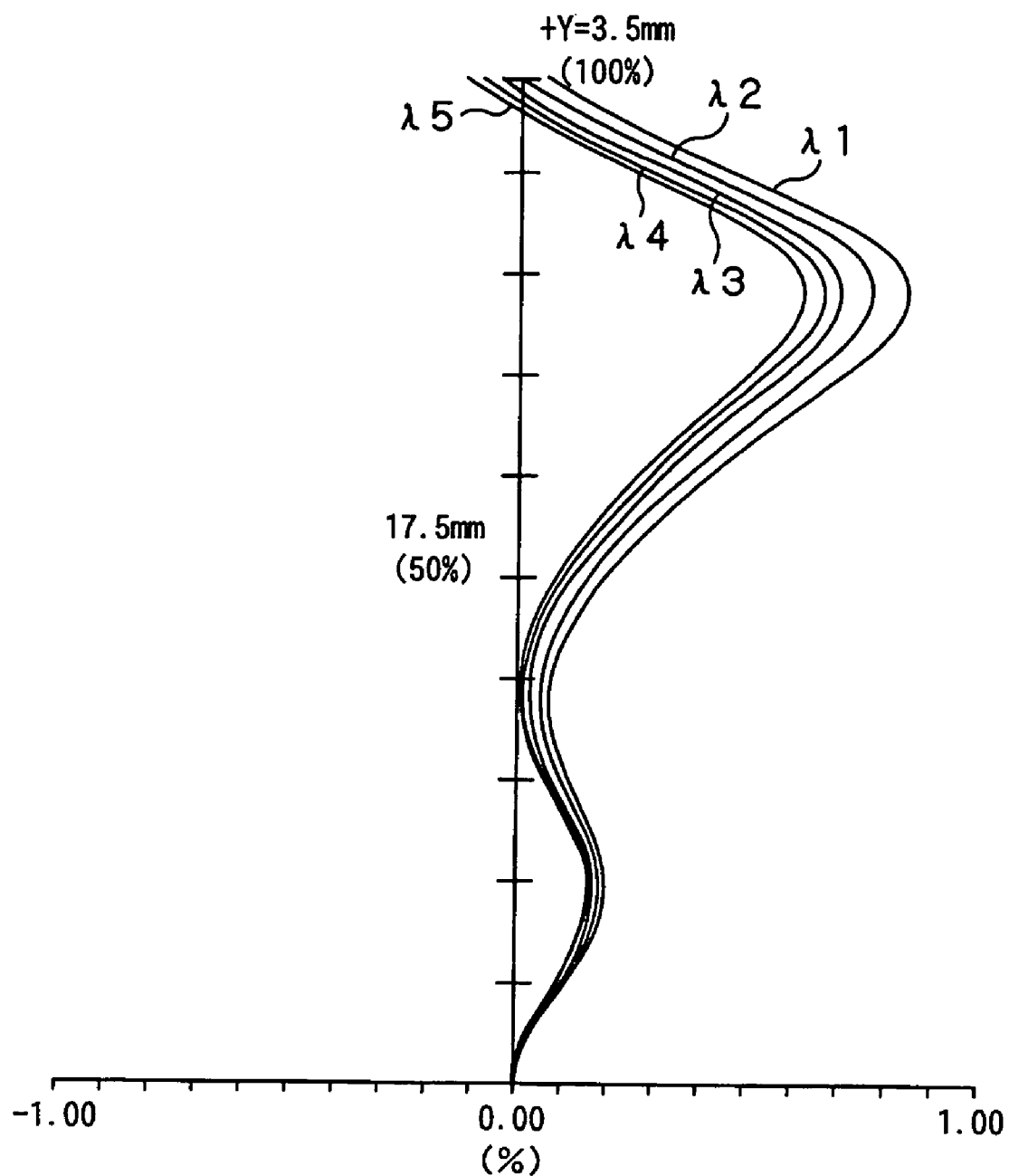
FIG. 25 is a graph of the distortion of the image pickup lens of Example 4.
Figure 26:
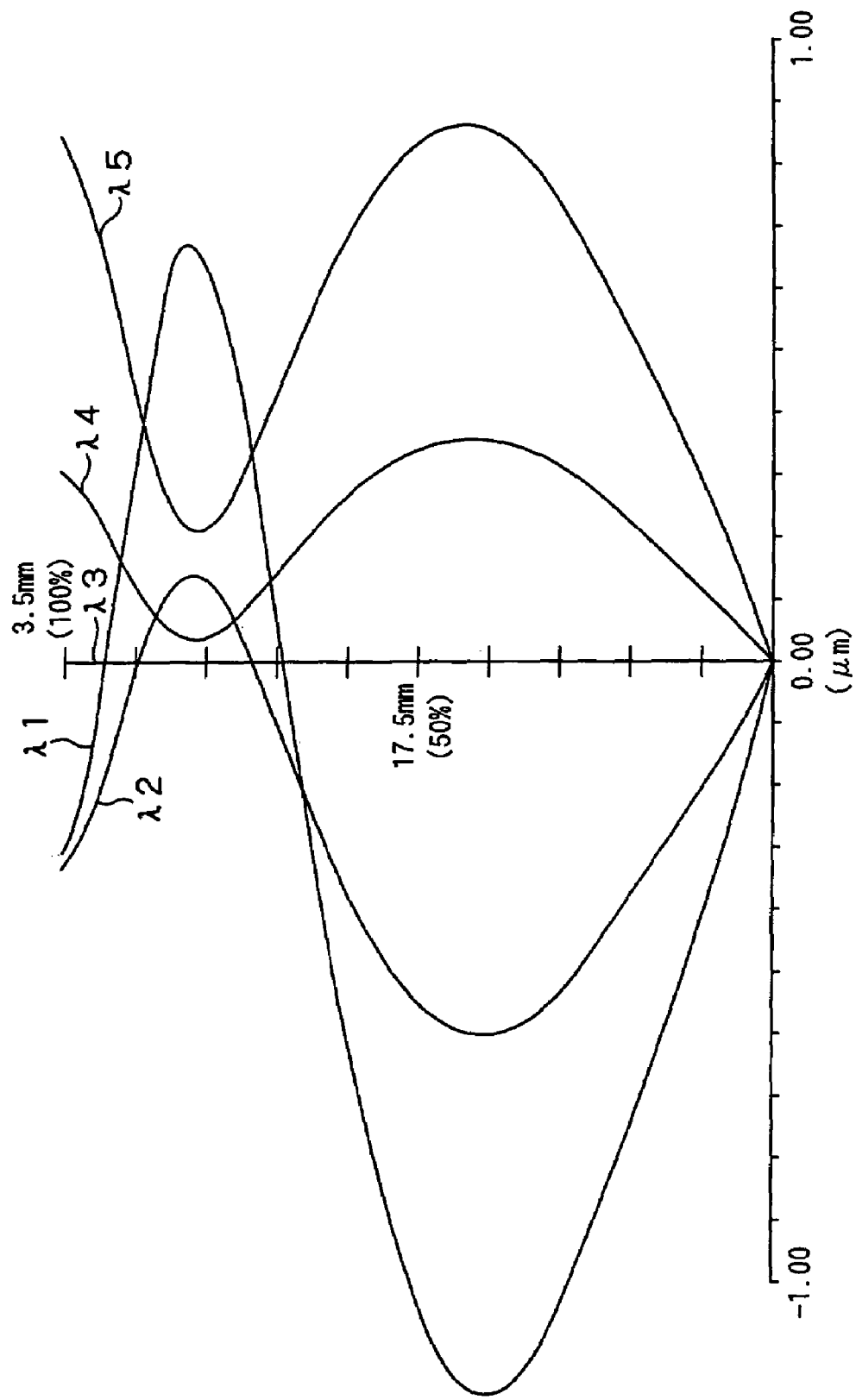
FIG. 26 is a graph of the chromatic difference of magnification of the image pickup lens of Example 4.

FIGS. 24, 25 and 26 show various aberrations of the image pickup lens 10 of Example 4 having the above-described configuration.

FIG. 24 shows the aberrations on the sagittal image plane (indicated by solid lines) and those on the tangential image plane (indicated by broken lines) for respective incident beams of light of wavelengths λ1 (0.436 μm), λ2 (0.486 μm), λ3 (0.546 μm), λ4 (0.588 μm) and λ5 (0.656 μm). As seen from FIG. 24, the image pickup lens 10 shows uniform aberrations and, while the aberrations on the sagittal image plane and those on the tangential image plane show large differences to raise the astigmatism at positions between the 40% image height and the 70% image height, the astigmatism is corrected once again at and near the 80% image height position.

FIG. 25 shows the distortions of the incident beams of light of wavelengths λ1, λ2, λ3, λ4 and λ5 that strike the image pickup lens 10 of Example 4. As seen from FIG. 25, the distortions of the above cited wavelengths are found within 1%. In other words, they satisfy the requirement of 1 to 2% of the distortion tolerance for ordinary photography lenses so that the image pickup lens 10 of Example 4 can satisfactorily operate as image pickup lens in a digital still camera.

FIG. 26 shows the chromatic differences of magnification of the incident beams of light of wavelengths λ1, λ2, λ4 and λ5 that strike the image pickup lens 10 of Example 4, using the chromatic difference of magnification of the incident beam of wavelength λ3 as reference. As seen from FIG. 26, while the chromatic differences of magnification of the incident beams of light are largest at the 40% image height position, they substantially satisfy the tolerance of ±1 μm so that the image pickup lens 10 of Example 4 can satisfactorily operate as image pickup lens in a digital still camera.

As seen from the graphs of FIGS. 24, 25 and 26, the image pickup lens 10 of Example 4 has an excellent aberration correcting function.

Figure 27:
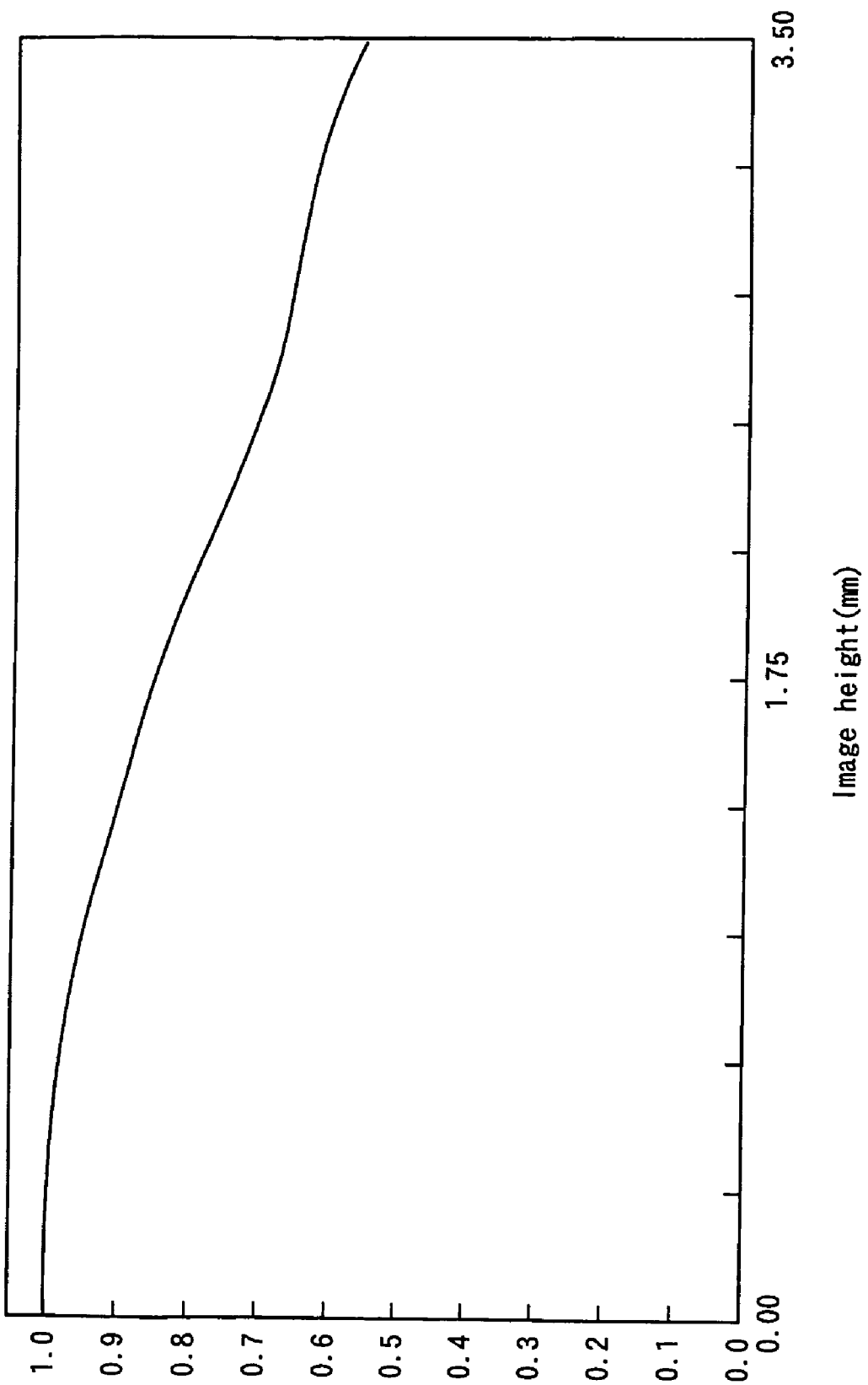
FIG. 27 is a graph of the relationship between the image height and the luminous flux of the image pickup lens of Example 4.

FIG. 27 is a graph of the relationship between the image height and the luminous flux of the image pickup lens 10 of Example 4 when the luminous flux is 1 at the center position. Generally, the luminous flux is highest at the center position and hence the image is light at the center. The luminous flux decreases as a function of the image height in the marginal area to make the image dark there. However, the image pickup lens 10 of Example 4 provides 50% or more at the 100% image height position out of the luminous flux at the center position as shown in FIG. 27. Thus, the image pickup lens 10 of Example 4 provides a sufficient degree of lightness.

Figure 28:
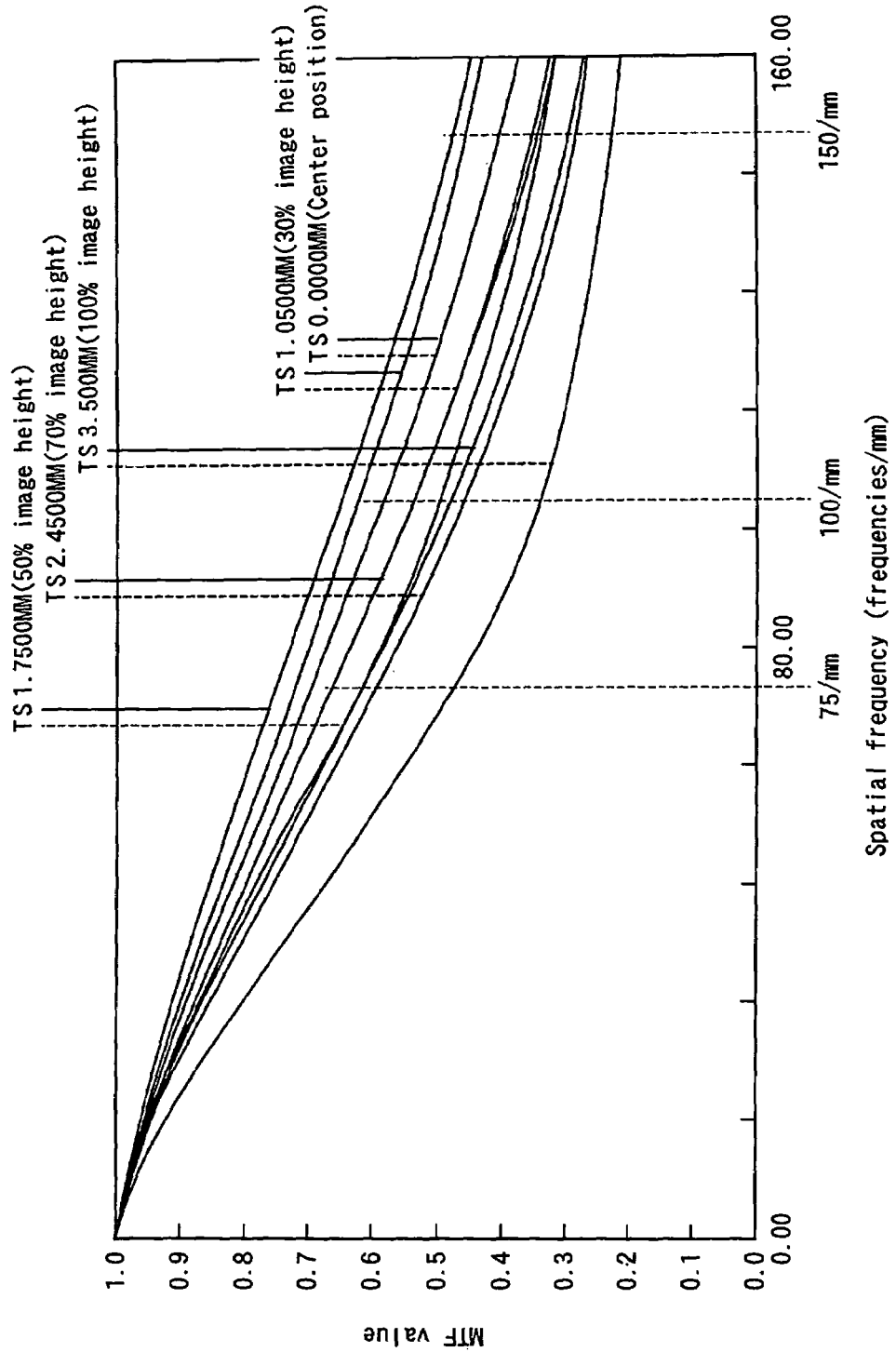
FIG. 28 is a graph of the MTF characteristics of the image pickup lens of Example 4.
Figure 29:
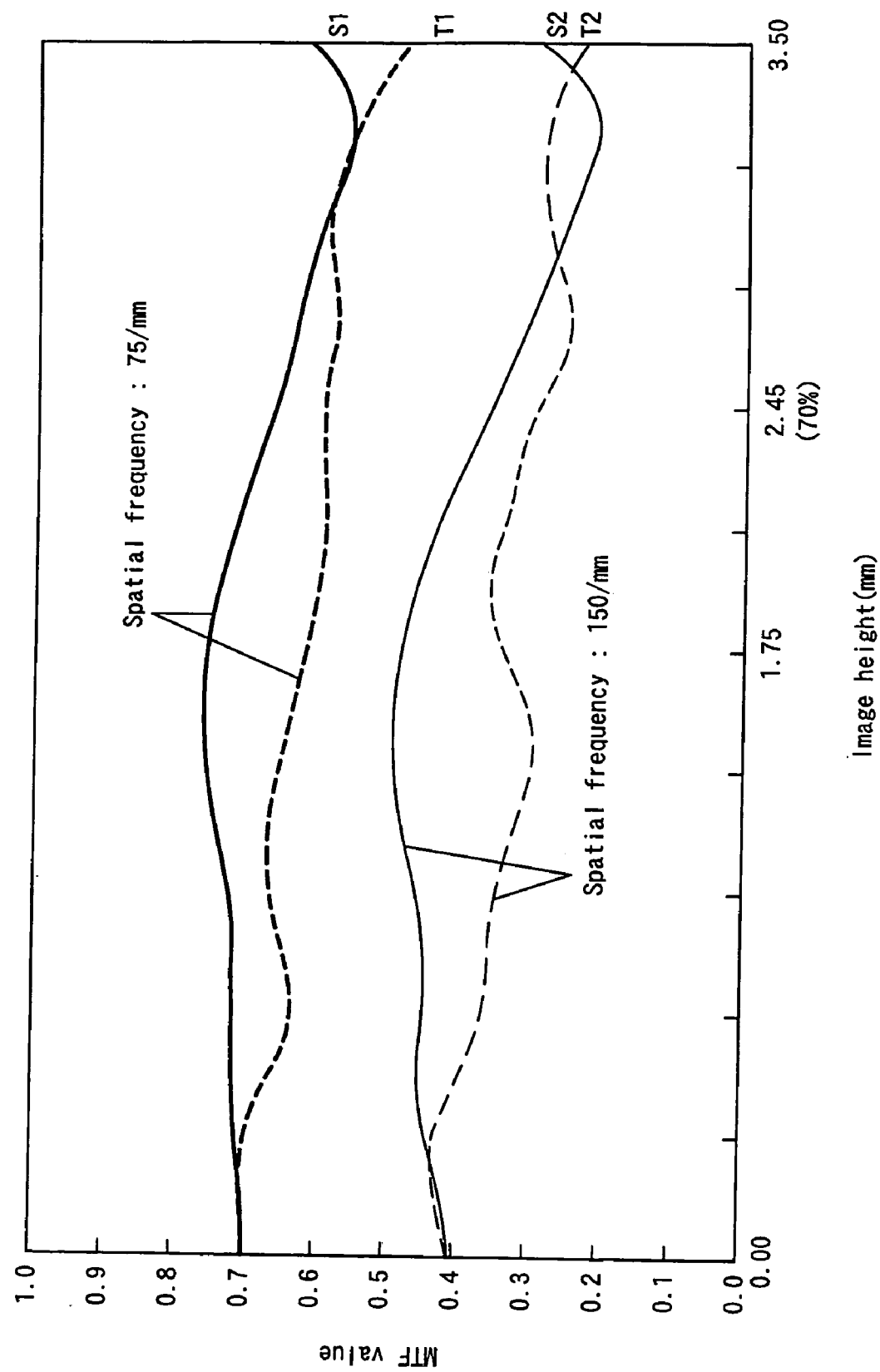
FIG. 29 is another graph of the MTF characteristics of the image pickup lens of Example 4.

Now, FIGS. 28 and 29 shows the MTF characteristics observed by means of the image pickup lens 10 of Example 4.

FIG. 28 is a graph illustrating the MTF characteristics of the sagittal image plane (indicated by solid lines S) and those

TABLE 9

| surface No. i | conical constant K | aspherical coefficients | | | | |
|---|---|---|---|---|---|---|
| | | A | B | C | D | E |
| 4 | −5.835 | $-2.101 \times 10^{-1}$ | $2.343 \times 10^{-1}$ | $-1.329 \times 10^{-1}$ | $3.859 \times 10^{-2}$ | $-4.512 \times 10^{-3}$ |
| 5 | −3.346 | $-1.007 \times 10^{-1}$ | $9.182 \times 10^{-2}$ | $-3.335 \times 10^{-2}$ | $6.006 \times 10^{-3}$ | $-4.089 \times 10^{-4}$ |
| 8 | −3.757 | $-4.036 \times 10^{-2}$ | $9.274 \times 10^{-3}$ | $-1.457 \times 10^{-3}$ | $6.735 \times 10^{-5}$ | 0 |
| 9 | −3.638 | $-2.891 \times 10^{-2}$ | $5.939 \times 10^{-3}$ | $-8.908 \times 10^{-4}$ | $6.093 \times 10^{-5}$ | $-1.675 \times 10^{-6}$ | of the tangential image plane (indicated by broken lines T) at the center position, at 30% image height position, at 50% image height position, at 70% image height position and at 100% image height position of the image plane 12a of the image pickup element 12. In FIG. 28, the horizontal axis represents the spatial frequency and the vertical axis represents the MTF value. It will be appreciated that the sagittal image plane and the tangential image plane show a same and identical MTF characteristic at the center position in FIG. 28 because they are rotationally symmetrical relative to the center position.

FIG. 29 is a graph illustrating the MTF characteristics in terms of the change in the MTF value relative to the image height when the spatial frequency is fixed to 75/mm and 150/mm. In FIG. 29, the horizontal axis represents the image height and the vertical axis represents the MTF value. It shows the MTF values on the sagittal image plane (indicated by solid line S1) and on the tangential image plane (indicated by broken line T1) when the spatial frequency is 75/mm and those on the sagittal image plane (indicated by solid line S2) and on the tangential image plane (indicated by broke line T2) when the spatial frequency is 150/mm.

As seen from FIG. 28, the MTF value of the image pickup lens 10 of Example 4 is about 0.4 (40%) at the center position when the spatial frequency is 160/mm so that the MTF value of the image pickup lens 10 is estimated to be about 0.3 (30%) at the center position when the spatial frequency is 200/mm. The MTF value of the image pickup lens 10 is about 0.6 (60%) at the center position when the spatial frequency is 100/mm, which remarkably exceeds the MTF design value of 30% when the spatial frequency is 200/mm and that of 50% when the spatial frequency is 100/mm shown in Table 1.

As seen from FIGS. 28 and 29, the MTF value of the image pickup lens 10 of Example 4 is about 0.25 (25%) at the 70% image height position on both the sagittal image plane and the tangential image plane when the spatial frequency is 150/mm and not less than 0.55 (55%) at the 70% image height position on both the sagittal image plane and the tangential image plane when the spatial frequency is 75/mm, both of which remarkably exceed the MTF design value of 25% for the spatial frequency of 150/mm and that of 40% for the spatial frequency of 75/mm.

Additionally, as seen from FIG. 29, the MTF value does not show any problem of a sudden fall between the center position and the 70% image height position. Rather, it will be seen that the image pickup lens 10 of Example 4 functions in such a way that the MTF value on the sagittal image plane and the MTF value on the tangential image plane show a difference that increases once but come to agree with each other above the 70% image height position for both the spatial frequency of 75/mm and the spatial frequency of 150/mm.

Thus, the resolving power of the image pickup lens 10 of Example 4 sufficiently satisfies the specified requirements for design shown in Table 1 so that the image pickup lens 10 can form a clear optical image on the image pickup plane 12a of an image pickup element 12 having a size of ½.7 inches and equipped with 3 million pixels.

While the image pickup lenses 10 of Examples 1 through 4 are applied to a digital still camera in the above description, the present invention is by no means limited thereto and an image pickup lens according to the present invention can equally be applied to a digital video camera.

It should be understood by those skilled in the art that various modifications, combinations, sub-combinations and alterations may occur depending on design requirements and other factors insofar as they are within the scope of the appended claims or the equivalents thereof.

What is claimed is:

1. An image pickup lens comprising, sequentially from the object side:
   an optical aperture;
   a first lens made of glass and having at least a spherical surface at the object side and a positive refracting power;
   a second lens made of resin and having two aspherical surfaces and a negative refracting power;
   a third lens made of glass and having at least a spherical surface at the object side and a positive refracting power; and
   a fourth lens made of resin and having two aspherical surfaces and a negative refracting power.

2. The lens according to claim 1, wherein at least either the first leans or the third lens is a plano-convex lens.

3. The lens according to claim 1, wherein, if the Abbe number and the focal length of the first lens are $vd_1$ and $f1$ respectively and the focal length of the image pickup lens as a whole is f, the first lens satisfies $vd_1 \geq 80$ and $0.95f \leq f1 \leq 1.1f$.

4. The lens according to claim 1, wherein, if the Abbe number and the focal length of the third lens are $vd_3$ and $f3$ respectively and the focal length of the image pickup lens as a whole is f, the third lens satisfies $vd_3 \geq 70$ and $1.5f \leq f3 \leq 2.5f$.

* * * * *